(12) United States Patent
Roach et al.

(10) Patent No.: US 11,577,813 B2
(45) Date of Patent: Feb. 14, 2023

(54) OUTER MEMBRANE FOR AERIAL VEHICLES

(71) Applicant: Aerostar International, LLC, Columbia, MD (US)

(72) Inventors: Kevin Roach, Boulder Creek, CA (US); Venkata Akula, Mountain View, CA (US); Paul Frey, Portola, CA (US)

(73) Assignee: Aerostar International, LLC, Sioux Falls, SD (US)

( * ) Notice: Subject to any disclaimer, the term of this patent is extended or adjusted under 35 U.S.C. 154(b) by 135 days.

(21) Appl. No.: 17/121,038

(22) Filed: Dec. 14, 2020

(65) Prior Publication Data

US 2022/0185442 A1 Jun. 16, 2022

(51) Int. Cl.
*B64B 1/18* (2006.01)

(52) U.S. Cl.
CPC ..................... *B64B 1/18* (2013.01)

(58) Field of Classification Search
CPC .... B64D 1/00; B64D 1/18; B64D 1/14; B64B 1/40; B64B 1/54; B64B 1/58; B64B 1/60; B64B 1/00; B64B 1/18; B64B 1/14
See application file for complete search history.

(56) References Cited

U.S. PATENT DOCUMENTS

| | | | | |
|---|---|---|---|---|
| 3,108,765 A * | 10/1963 | Stone | ........................ | B64B 1/62 244/31 |
| 4,711,416 A * | 12/1987 | Regipa | ........................ | B64B 1/60 244/128 |
| 5,348,251 A * | 9/1994 | Ferguson | ........................ | B64B 1/60 244/30 |
| 9,834,296 B1 * | 12/2017 | Clarin | ........................ | B64B 1/60 |
| 10,144,496 B2 * | 12/2018 | Smith | ........................ | B64B 1/40 |
| 2005/0236519 A1 * | 10/2005 | Handley | ........................ | B64B 1/06 244/128 |
| 2010/0012772 A1 * | 1/2010 | Izutsu | ........................ | B64B 1/44 244/31 |
| 2014/0158823 A1 * | 6/2014 | Smith | ........................ | B64B 1/30 156/244.11 |
| 2022/0185442 A1 * | 6/2022 | Roach | ........................ | B64B 1/60 |

FOREIGN PATENT DOCUMENTS

| | | |
|---|---|---|
| DE | 10326688 A1 | 12/2004 |
| WO | 2019173443 A1 | 9/2019 |

OTHER PUBLICATIONS

"International Application Serial No. PCT/US2021/063404, International Search Report dated Mar. 3, 2022", 2 pgs.
"International Application Serial No. PCT/US2021/063404, Written Opinion dated Mar. 3, 2022", 4 pgs.

* cited by examiner

*Primary Examiner* — Justin M Benedik
(74) *Attorney, Agent, or Firm* — Kim and Lahey Law Firm, LLC

(57) ABSTRACT

Aspects of the disclosure relate to an aerial vehicle. The aerial vehicle may include an envelope having a plurality of tendons and formed from a first plurality of gores. The aerial vehicle may also include one or more ballonets arranged within the envelope. An outer membrane may be arranged around at least part of the envelope and formed from a second plurality of gores. The outer membrane may include at least one panel attached at one side to the outer membrane between a pair of the second plurality of gores and attached at an opposite side to the envelope. The outer membrane may be arranged to improve aerodynamics of the envelope when the aerial vehicle is in flight.

20 Claims, 26 Drawing Sheets

Front View

OUTER MEMBRANE FOR AERIAL VEHICLES

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network. Because of the various forces experienced by these balloons during deployment and operation, there is a balancing of needs between flexibility and stability of materials. As such, the balloons include a flexible envelope made of material that may be configured in sections or lobes to create a "pumpkin"-shaped, lobed envelope. These lobes are supported by a plurality of tendons. During normal operations, the envelope is filled with gas so that it can float above the Earth.

BRIEF SUMMARY

One aspect of the disclosure provides an aerial vehicle. The aerial vehicle includes an envelope having a plurality of tendons and formed from a first plurality of gores; one or more ballonets arranged within the envelope; an outer membrane arranged around at least part of the envelope and formed from a second plurality of gores; and at least one panel attached at one side to the outer membrane between a pair of the second plurality of gores and attached at an opposite side to the envelope, and wherein the outer membrane is arranged to improve aerodynamics of the envelope when the aerial vehicle is in flight.

In one example, the envelope includes lateral and longitudinal tendons, and wherein the opposite side is attached to one of the lateral tendons. In another example, the outer membrane is formed from a first material of a first thickness, and wherein the envelope is formed from the first material of a second thickness, the first thickness being less than the second thickness. In another example, the outer membrane is formed from a first material of a first thickness, and wherein the envelope is formed from a second material, the first material being different from the second material. In another example, the envelope is a pumpkin shaped envelope. In this example, the outer membrane is attached to a top end plate of the envelope. In addition, the outer membrane is sealed completely around the top end plate. Alternatively, the outer membrane is sealed partially around the top end plate such that air may pass between the top end plate and the outer membrane and between the outer membrane and the envelope. In addition or alternatively, the outer membrane is attached to a bottom end plate of the envelope. In another example, the envelope is a prolate spheroid shaped envelope. In this example, the outer membrane is attached to an end plate of the envelope. In addition, the outer membrane is sealed completely around the end plate. Alternatively, the outer membrane is sealed partially around the end plate such that air may pass between top end plate and the outer membrane and between the outer membrane and the envelope. In addition or alternatively, the outer membrane is attached to a second end plate of the envelope. In another example, the envelope is an airship shaped envelope. In this example, the outer membrane is attached to a forward end plate of the envelope. In addition, the outer membrane is sealed completely around the forward end plate. Alternatively, the outer membrane is sealed partially around the forward end plate such that air may pass between the forward end plate and the outer membrane and between the outer membrane and the envelope. In addition or alternatively, the outer membrane is attached to a rearward end plate of the envelope. In another example, the outer membrane is configured to stretch over the envelope when the envelope is pressurized.

DETAILED DESCRIPTION

Overview

The technology relates to providing an outer membrane to an aerial vehicle in order to provide a smoother contour. For example, the lobed shapes of these aerial vehicles can result in quite a bit of drag. Thus, an outer membrane may be used to improve the aerodynamics of the aerial vehicle.

The aerial vehicle may be a balloon having an envelope and one or more internal ballonets. The envelope may be formed from a plurality of gores resembling airship shape (e.g. one end is more elongated than the other), a prolate spheroid shape (e.g. a symmetrical shape like a football), or a rounded pumpkin. Between the gores or in the midline of these gores, tendons may be arranged to provide additional support for the envelope. In the case of the prolate spheroid or airship shapes, the tendons may be arranged both laterally and longitudinally providing a "quilted" appearance. The envelope and/or the ballonets may include lift gas and/or ballast air to control the pitch and altitude of the balloon.

In order to provide the smoother contour, the outer membrane may be formed from a plurality of gores heat sealed to one another using the same material as the envelope and/or the ballonets. The outer membrane need not include tendons, but may be attached to the envelope. Although arranged on the outside of the envelope, the dimensions of the outer membrane may be smaller than the dimensions of the envelope. In some instances, the outer membrane may extend around the entire envelope. In other instances, the outer membrane may extend only part of the way over the envelope. In order to provide additional stability to the outer membrane as it stretches, it may be attached to the envelope using panels. The panels may prevent the outer membrane from rotating around the envelope.

The features described herein may provide for a shaped envelope for an aerial vehicle with improved aerodynamics. Given that the lobed shapes of the envelopes described here can generate quite a bit of drag, adding the outer membrane provides a smoother profile for air flow which in turn results in drag reduction by 25% or more. This is a significant improvement in the aerodynamics of these envelopes which also improves the maneuverability and efficiencies of these aerial vehicles.

Example System

Figure 1:
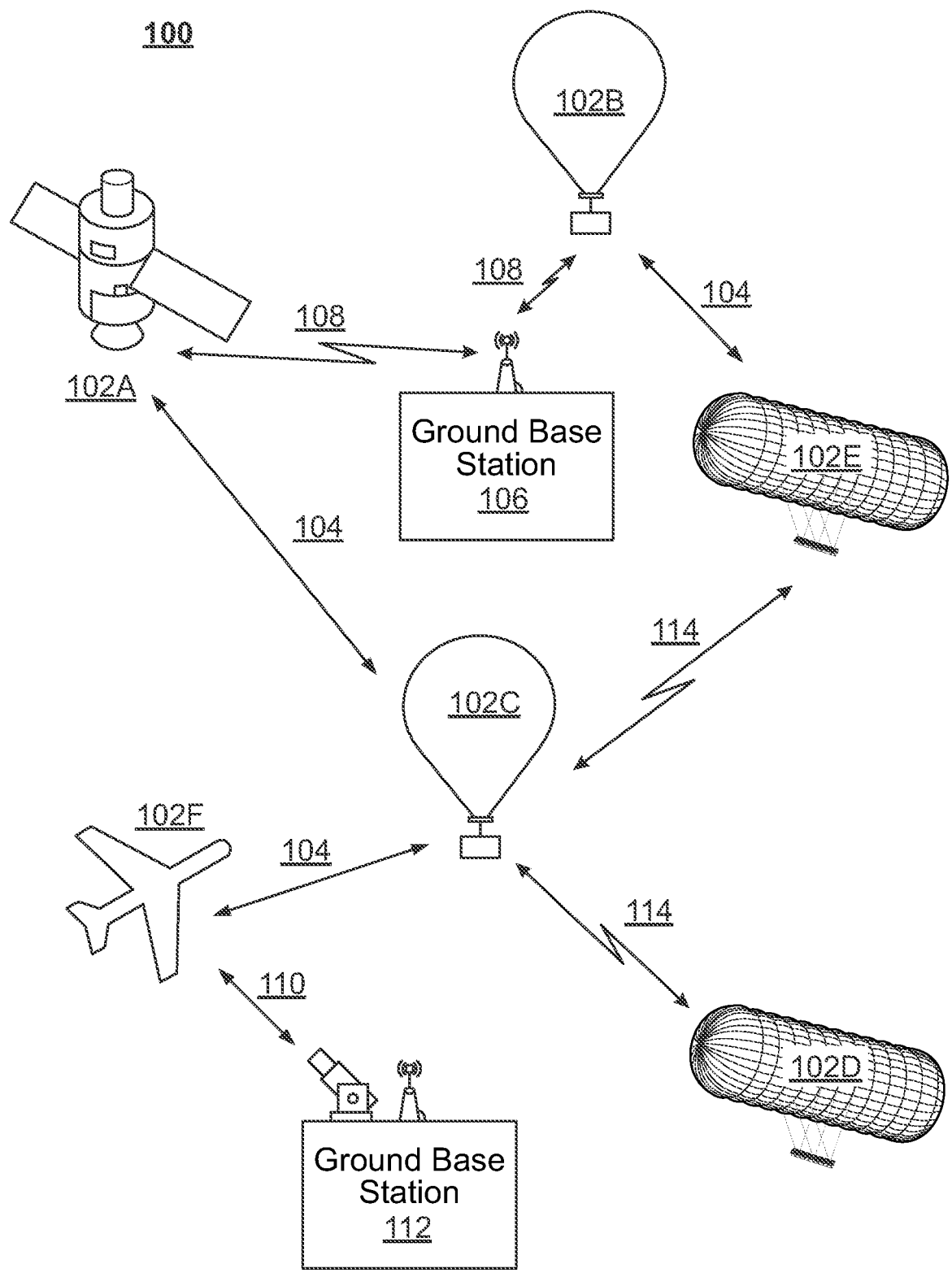
FIG. 1 is an example system including a network of aerial vehicles in accordance with aspects of the disclosure.

FIG. 1 depicts an example system 100 in which an aerial vehicle as described above may be used. This figure should not be considered as limiting the scope of the disclosure or usefulness of the features of the present disclosure. As such, the system 100 includes a plurality of devices, such as aerial vehicles 102A-F, ground base stations 106, 112 and links 104, 108, 110, 114 that are used to facilitate intra-vehicle communications as well as communications between the base stations and the aerial vehicles. In this example, system 100 may be considered an "aerial vehicle network" though in addition to satellite 102A, aerial vehicles 102B, 102C (shaped as balloons), aerial vehicles 102D, 102E having an oblong, prolate spheroid or airship shaped envelope, and aero plane 102F, the network may include other types of aircraft. One example of an aerial vehicle is discussed in greater detail below.

Example Aerial Vehicle

The aerial vehicle may be a balloon having an envelope and one or more internal ballonets. The envelope may be formed from a plurality of gores resembling a rounded pumpkin or prolate spheroid shape (e.g. football) or airship shape (e.g. one end is more elongated than the other). Between the gores or in the midline of these gores, tendons may be arranged to provide additional support for the envelope. In the case of the oblong, prolate spheroid or airship shapes, the tendons may be arranged both laterally and longitudinally providing a "quilted" appearance. The envelope and/or the ballonets may include lift gas and/or ballast air to control the pitch and altitude of the balloon.

Figure 2A:
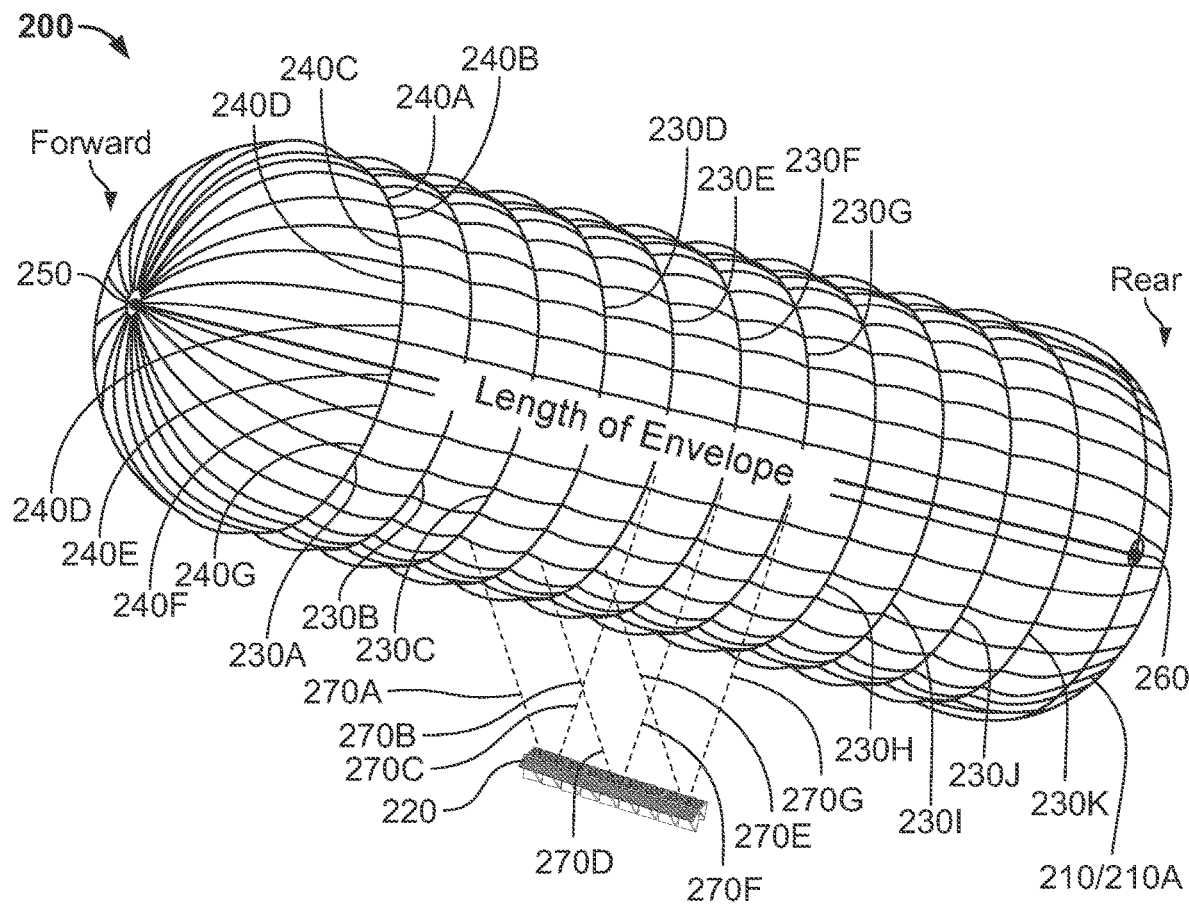
FIG. 2A is an example perspective view of an aerial vehicle in accordance with aspects of the disclosure.

FIG. 2A is an example of an aerial vehicle 200A which may correspond to aerial vehicle 102C and/or aerial vehicle 102D, again, having an oblong envelope 210. As shown, the aerial vehicle 200A also includes a payload 220, a plurality of longitudinal tendons 230A-230K, a plurality of lateral tendons 240A-240g (not all lateral tendons being called out for clarity), a pair of opposing end plates 250, 260, and a plurality of support tendons 270A-270F.

The lateral and longitudinal tendons may maintain the oblong shape of the envelope and thus provide structural support for the envelope 210 as well as the payload 220. In order to do so, each tendon may be formed from high-strength, light-weight ropes or other materials. For example, each tendon may be comprised of braided webbing or hollow braided rope. The webbing may include a plurality of warp and weft fibers woven together. In some instances, the fibers may be an ultra-high-molecular-weight polyethylene (UHMWPE) fiber like Dyneema. Other options include other types of UHMWPE fibers known as Spectra, Tensylon, Twaron and possibly others that have low fiber extensibility.

The plurality of longitudinal tendons may cross over or under each of the plurality of lateral tendons, and the plurality of longitudinal tendons may be arranged in circumferential rings around the envelope 210. In other words, each longitudinal tendon extends completely around the envelope 210. To do so, each longitudinal tendon may be stitched to itself, for instance using a bar tack or another stitching pattern to form a loop or ring, for instance, using a polyester or other type of thread. As shown, there are 11 longitudinal tendons, though more or less tendons (e.g. 5, 9, 13, etc.) may be used to maintain a particular shape of the envelope depending on the length and width of the envelope.

FIGS. 2A-2E provide perspective views of differently shaped envelopes 210A, 210B, 210C, 210D, 210E which may correspond to the envelope 210. In this regard, references to envelope 210 below may also refer to any of envelopes 210A-210E. For instance, as shown in FIGS. 2A-2D, the number and lengths of the longitudinal tendons may define the shape of the envelopes 210A-E. In FIG. 2A, the longitudinal tendons are all the same or very similar length in order to maintain a generally uniform diameter of each ring and thereby a generally uniform shape of the envelope 210A between the forwardmost tendon, tendon 230A, and the rearmost tendon, tendon 230K.

Figure 2B:
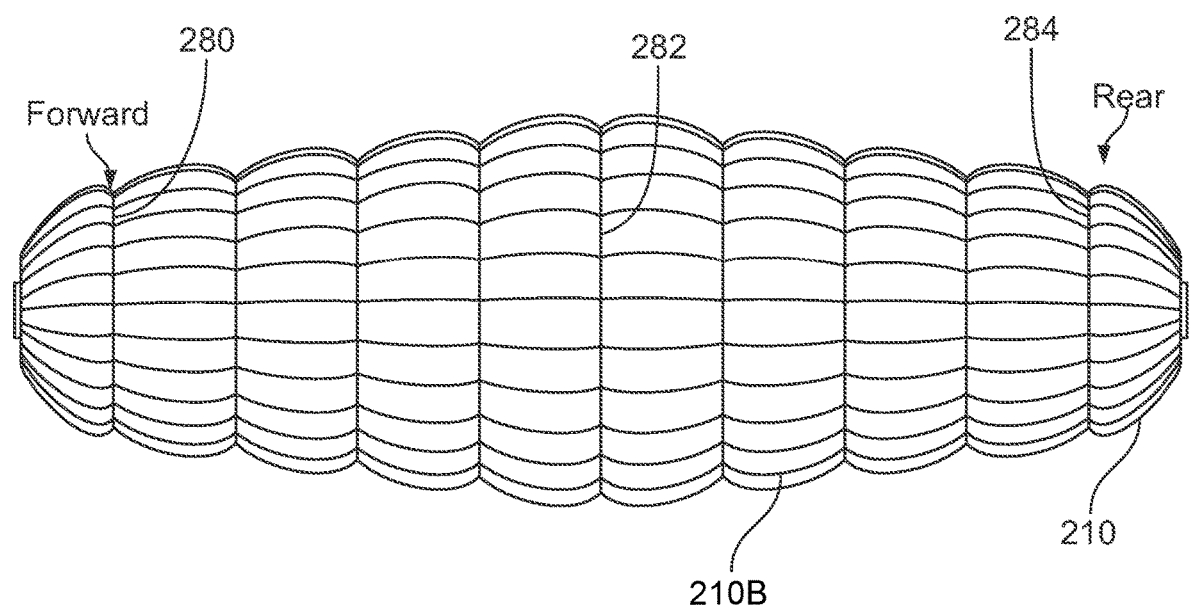
FIGS. 2B-2E are example perspective views of envelopes in accordance with aspects of the present disclosure.
Figure 2C:
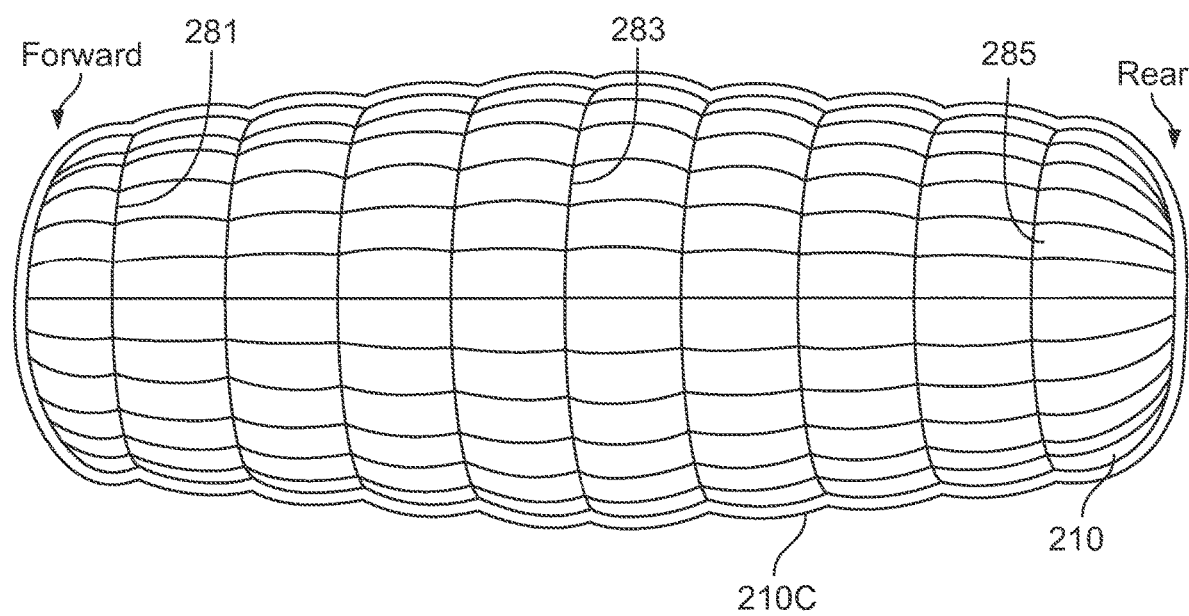

If the longitudinal tendons have different lengths, the rings will have different diameters which may lead to differently shaped envelopes. For example, FIGS. 2B and 2C depict "football" or oval-shaped envelopes 210B, 210C, where the length of each of the longitudinal tendons (and the diameters of the respective rings) increases from the forwardmost longitudinal tendons 280, 281 to the longest longitudinal tendons 282, 283 between the forwardmost longitudinal tendons and the rearmost longitudinal tendons 284, 285, and then decreases from the longest longitudinal tendon to the rearmost longitudinal tendon. In the example of envelope 210B of FIG. 2B a ratio of the length of the longest longitudinal tendon to the length of the shortest longitudinal tendon, here the forwardmost longitudinal tendon 280 or the rearmost longitudinal tendon 284, is 3:2. In the example of envelope 210C of FIG. 2C a ratio of the length of the longest longitudinal tendon to the length of the shortest longitudinal tendon, here forwardmost longitudinal tendon 281 or the rearmost longitudinal tendon 285, is 5:4.

Figure 2D:
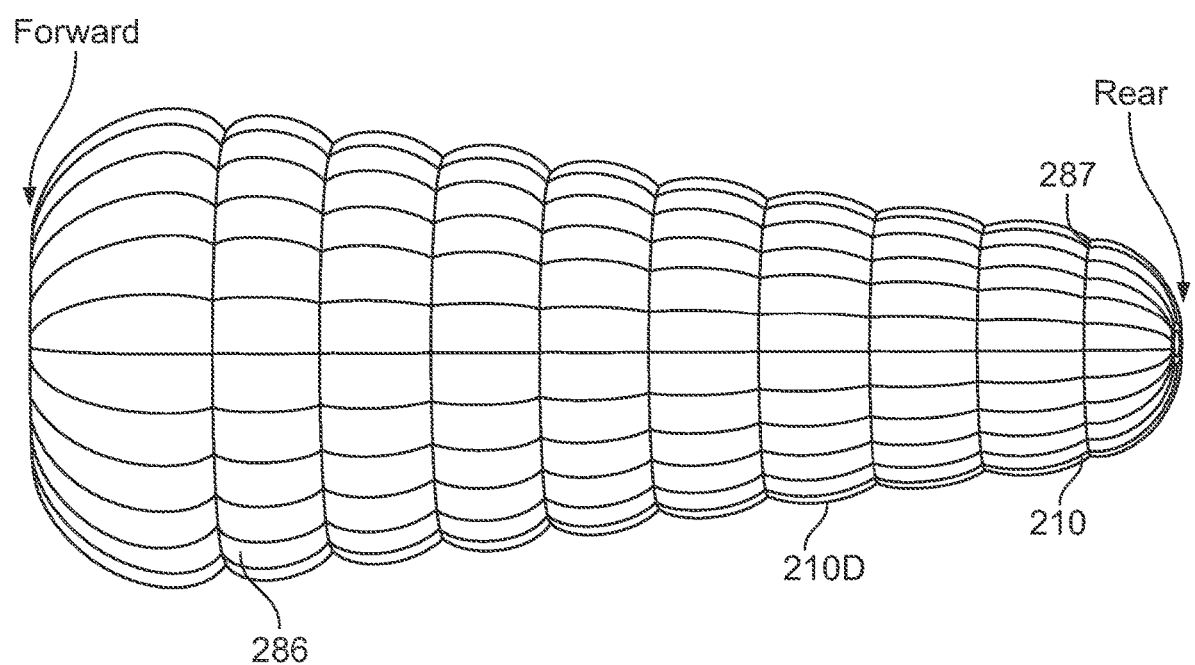
Figure 2E:
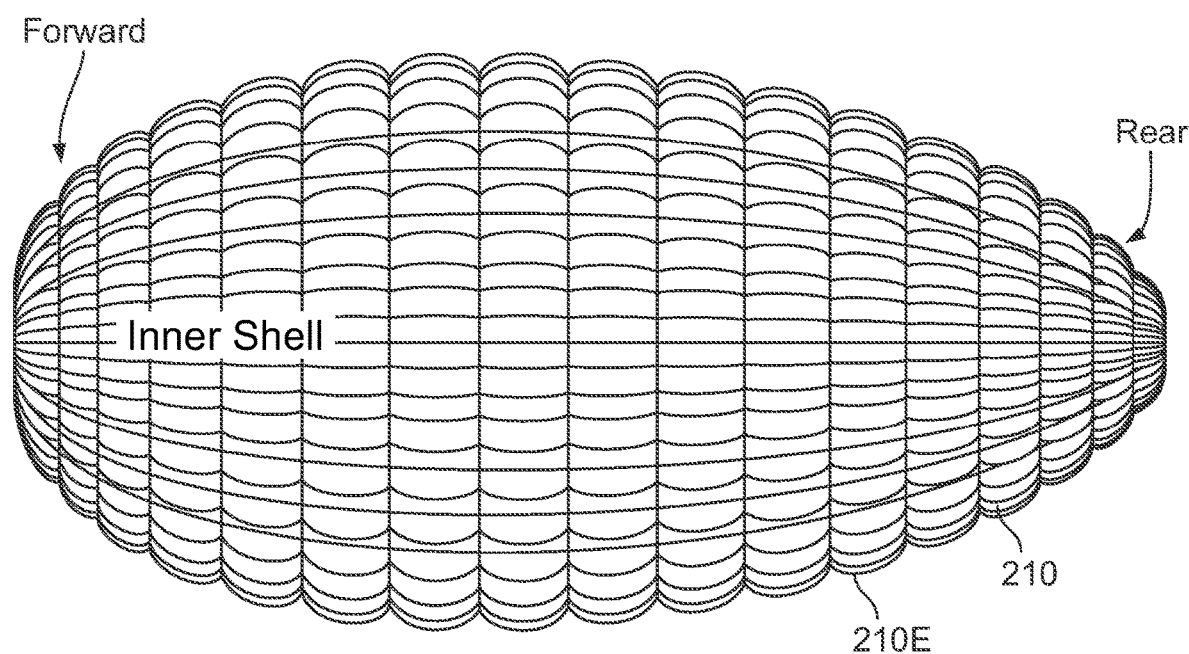

In the example of envelope 210D of FIG. 2D, the length of each of the longitudinal tendons (and the diameters of the respective rings) decreases from the forwardmost longitudinal tendon 286 to the rearmost longitudinal tendon 287. In this example, a ratio of the length of the forwardmost (here the longest) longitudinal tendon 286 to the length of the rearmost longitudinal tendon 287 (here the shortest) is 2:1. In the example of envelope 210E of FIG. 2E, rather than having a symmetrical shape, the aerial vehicle has a more airship-like shape such that the profile of the aerial vehicle may be defined by an elliptical, parabolic, or polynomial equation and/or there are no "severe" changes in curvature along the profile.

Because differently shaped envelopes will have different drag effects, the shape of the envelope, including the number and lengths of the longitudinal tendons, may be selected based upon how much power is available, for instance from batteries of the payload, to power the aerial vehicle. For instance, the envelopes 210D, 210E of FIGS. 2D and 2E may have a much lower drag effect than the envelopes 210A, 210B, 210C of FIGS. 2A, 2B, and 2C.

Figure 3:
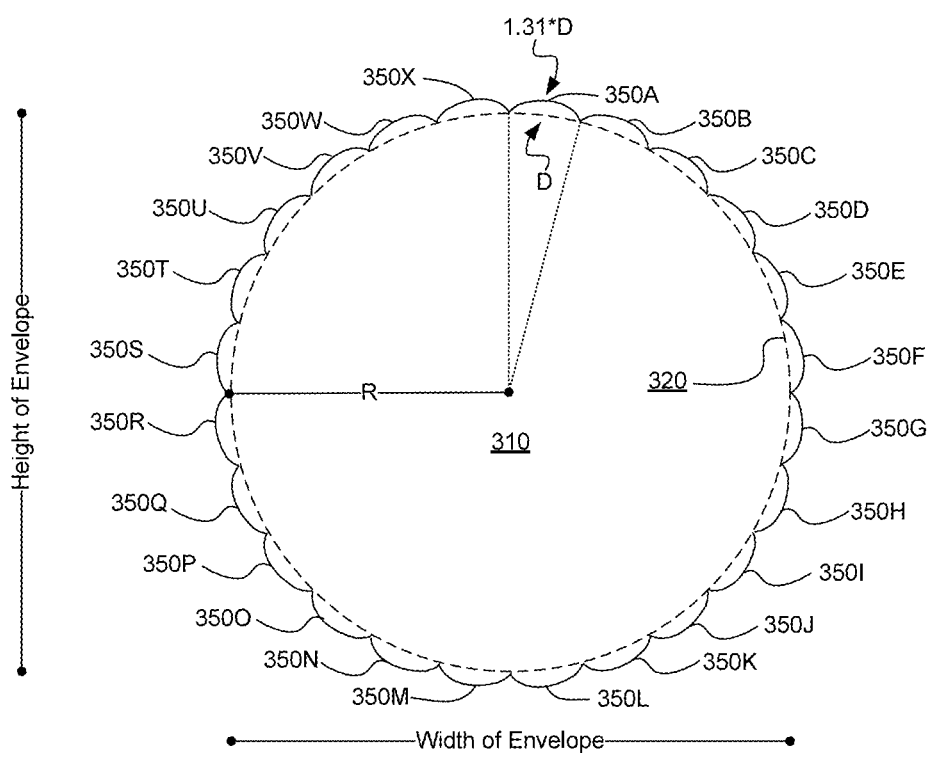
FIG. 3 is an example cross-section of an envelope of an aerial vehicle in accordance with aspects of the disclosure.

Returning to the example of FIG. 2A, the envelope 210 may also include a plurality of lateral tendons 240A-K. As an example the aerial vehicle may have been 24 and 36 lateral tendons, though more or less tendons may be used depending on the size of the envelope. Each lateral tendon may be arranged in a sleeve (see FIG. 4) that extends along the length of the envelope 210 between a pair of adjacent gores or rather at a gore seam. In this configuration, for ease of manufacturing and assembly, the longitudinal tendons may always cross over the lateral tendons. In the examples of FIGS. 2A and 3, the envelope 210A may be approximately 30 meters long (measured between the end plates 250, 260) and 10 meters high.

Lateral tendons may run along the length of the envelope 210 and between the pair of end plates 250, 260 discussed further below. The lateral tendons may be attached to the pair of end plates in various ways including loops around a ring, peg or other structures, clamping, or simply by crossing over the plate and being secured to itself or another of the lateral tendons. Each of the lateral tendons may span the distance between the termination planes and be the same length or approximately the same length. In other words, there may be some small differences, for example, on the order of 2.5 centimeters or more or less on a 25-meter tendon due to manufacturing processes).

The plurality of lateral tendons may provide the envelope 210 with a lobed shape, and the combination of the lateral tendons and the longitudinal tendons may form a plurality of polygonal, such as square, trapezoidal or rectangular, "pillow" shapes as can be seen in FIG. 2A. FIG. 3 depicts a cross-sectional view of envelope 310 between a pair of the longitudinal tendons. Envelope 310 includes 24 gores 350A-350X. For clarity, the tendons are not depicted, but they would be arranged between the gores outside of the envelope 310. As shown, each gore also represents a cross sectional view of one of the pillows. In this regard, envelope 310 may be comparable to envelope 210, though there are fewer lateral tendons and gores for ease of understanding. In this example, the cross-section forms a circle represented by dashed-line circle 320 with a radius R, here being approximately 5 meters.

Each gore, as indicated with respect to gore 350A, corresponds to a distance D around the arc of the circle. However, can be seen, each gore includes excess material and thus forms a lobed shape when the envelope pressurized (as shown in FIG. 2A), for instance, when the aerial vehicle reaches a particular altitude or environmental pressure. In this example, the length of the excess material for gore 350A (and also gores 350B-350X) is approximately 1.31*D. The same or a similar amount of excess material (or longer if the pillow has a rectangular shape) may be included in the lateral direction in order to form the pillow shape between the lateral and longitudinal tendons.

In some instances, certain ratios (as discussed above in relation to FIGS. 2A, 2B, 2C, 2D, 2E) may be more preferable than others in terms of length to diameter across all envelope shapes depending upon the altitude range for which the aerial vehicle will be used. Also, some envelope and pillow shapes may result in a "golf ball" effect with detaching and reattaching flow due to the uneven lobe geometry. For example, the dimples in a golf ball may result in uneven pressure above and below the golf ball which causes an upward or lift force on the golf ball (making it go farther than a smooth ball). A similar effect caused by the pillow-shaped sections of the envelope (discussed further below) may significantly reduce drag on the envelope at high enough speeds, such as those greater than 10 m/s). In addition, it may be possible to further improve and/or balance pillow size (and stress) with drag generation by manipulating the overall shape of the envelope.

Figure 4:
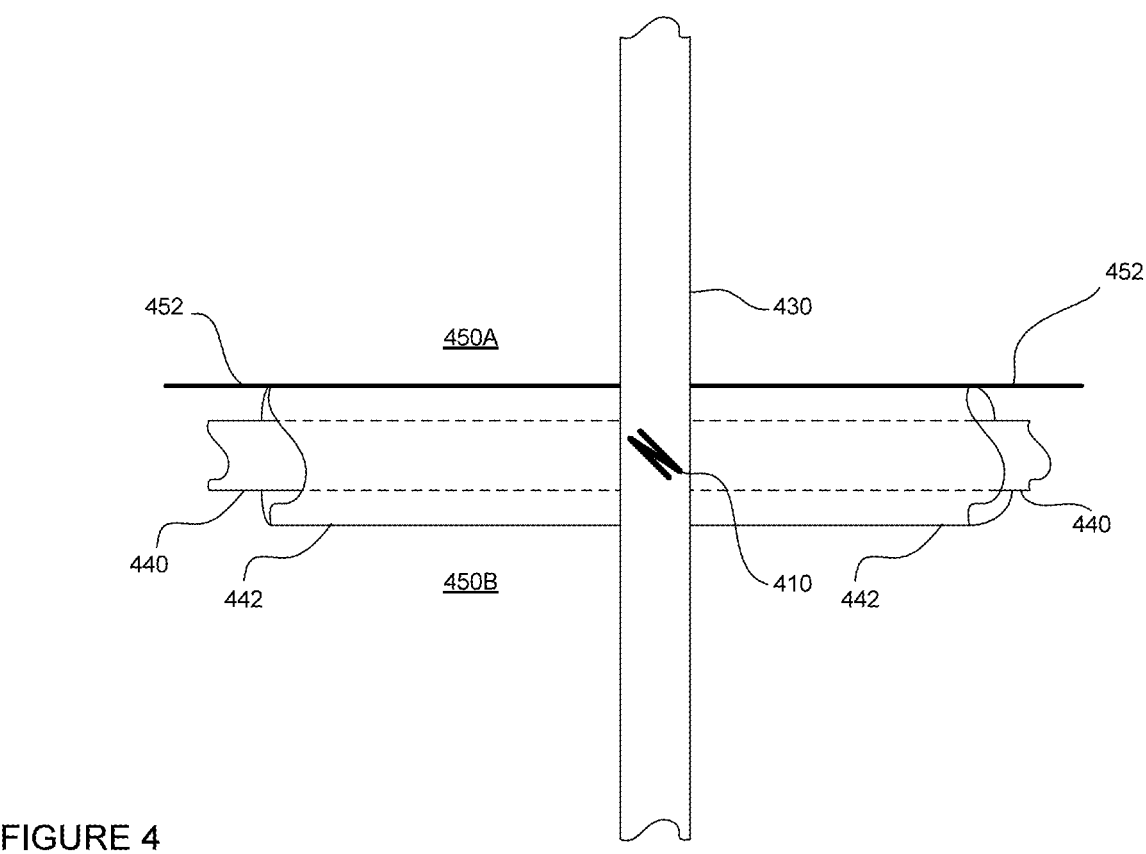
FIG. 4 is an example view of a portion of an envelope of an aerial vehicle in accordance with aspects of the disclosure.

The lateral and longitudinal tendons may be secured relative to one another as well as the envelope 210 in order to maintain the shape of the envelope 210 and reduce or eliminate foreshortening along the length of the envelope. In some instances, a bar tack 410 or another stitching pattern may be used to secure a longitudinal tendon 430 to a lateral tendon 440 as shown in FIG. 4 using a polyester or other type of thread. In this regard, the stitching may extend through a sleeve 442 which is attached to a gore seam 452 between two gores 450A, 450B. The portion of the lateral tendon 440 that is depicted within sleeve 442 is depicted in dashed-line to indicate that the lateral tendon 440 is within sleeve 442. For reference, the longitudinal tendon 430 may correspond to any of the plurality of longitudinal tendons 230A-230K, and lateral tendon 440 may correspond to any of the plurality of lateral tendons 240A-240G or any of the other lateral tendons of FIG. 2A. In the example of FIG. 4, only a portion of the tendons, gore seam, gores and sleeve are depicted and only a portion of the lateral tendon 440 is depicted within the sleeve 442 for clarity. However, the sleeve 442 may actually extend along the length of the gore seam 452 between the end plates 250, 260.

Figure 5:
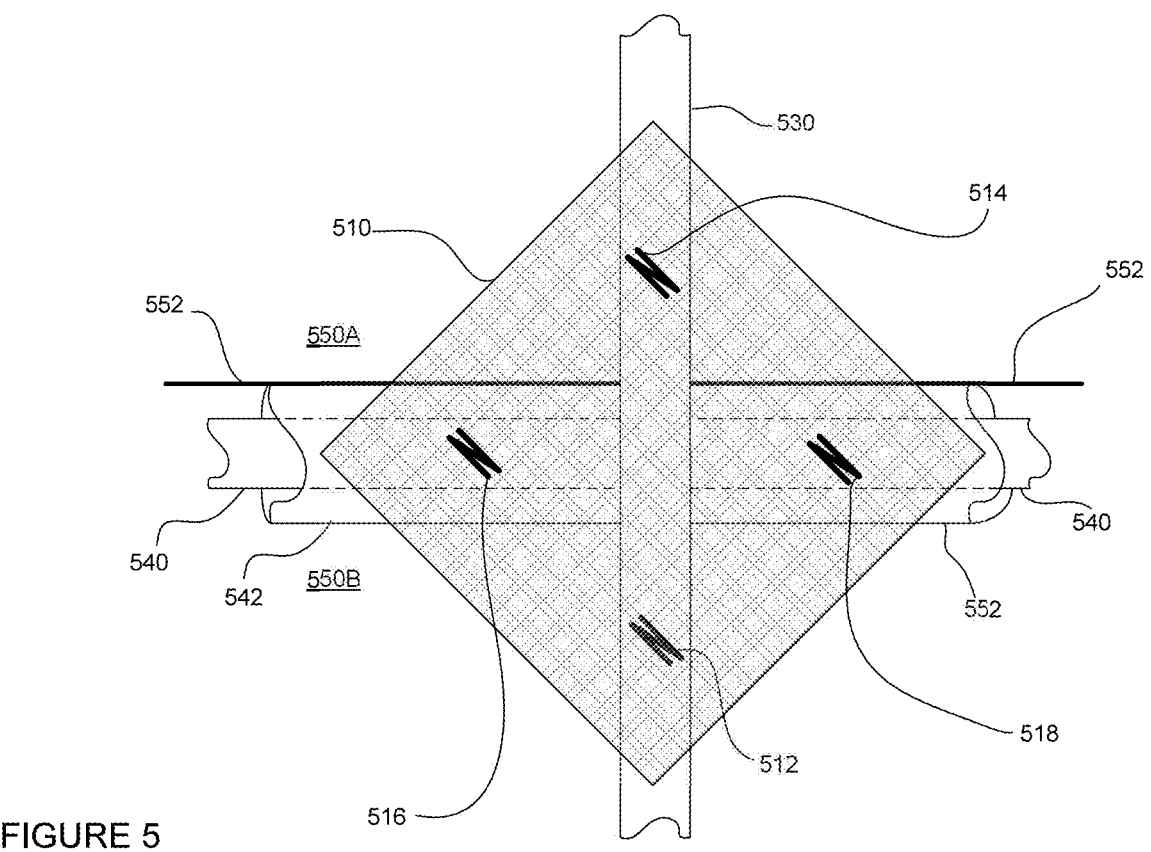
FIG. 5 is an example view of a portion of an envelope of an aerial vehicle in accordance with aspects of the disclosure.

Alternatively, as shown in FIG. 5, a sheet of additional material 510, such as a nylon sheet, may be attached to one or more tendons at locations where a longitudinal tendon and a lateral tendon overlap with one another. The additional material overlaps with at least a portion of the longitudinal tendon 530 and at least a portion of a lateral tendon 540. The longitudinal tendon 530 may be bar tacked via bar tack 512, 514 to the additional material 510 at two locations, and the additional material may also be bar tacked to the lateral tendon 540 via bar tack 516, 518 at two locations. In this regard, the stitching may extend through a sleeve 542 which is attached to a gore seam 552 between two gores 550A, 550B. The additional material 510 may maintain the relative positions of the longitudinal tendon 530 and the lateral tendon 540, maintain the relative position of the lateral tendon 540 with respect to the sleeve 542, and reduce the load at the bar tacks on the envelope material. As with FIG. 4, the portion of the lateral tendon 540 that is depicted within sleeve 542 is depicted in dashed-line to indicate that the lateral tendon 540 is within sleeve 542. For reference, the longitudinal tendon 530 may correspond to any of the plurality of longitudinal tendons 230A-230K, and lateral tendon 540 may correspond to any of the plurality of lateral tendons 240A-240G or any of the other lateral tendons of FIG. 2A. In the example of FIG. 5, only a portion of the tendons, gore seam, gores and sleeve are depicted and only a portion of the lateral tendon 540 is depicted within the sleeve 542 for clarity. However, the sleeve 542 may actually extend along the length of the gore seam 552 between the end plates 250, 260.

Figure 6:
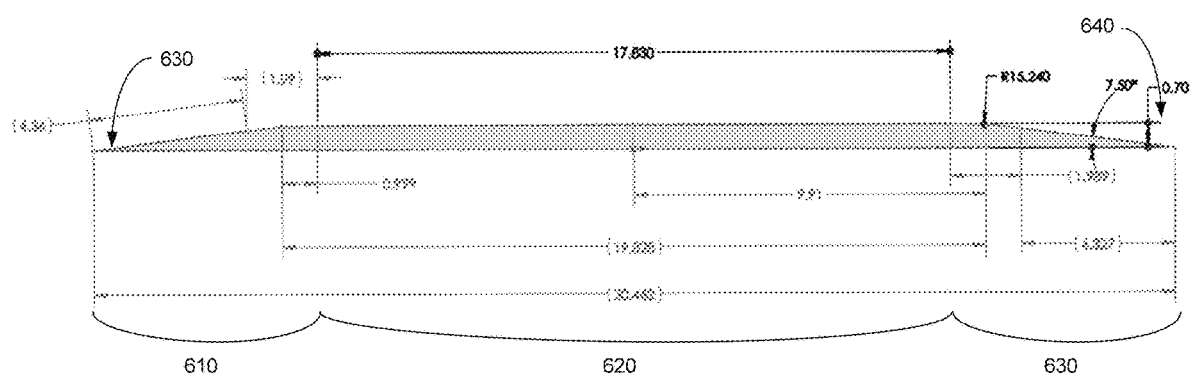
FIG. 6 is an example shape and dimensions of gore material corresponding to a single gore of an envelope in accordance with aspects of the disclosure.

In view of the goal of making the envelope 210 as lightweight as possible, the envelope material may be formed from various plastics and the gores heat sealed to one another similar to a typical balloon manufacturing process. Sheets of the envelope material may be heat sealed to one another to form the wedge shape of the gore. FIG. 6 depicts an example shape and dimensions (in meters) of gore material corresponding to a single gore of an envelope having 24 gores. In this regard, the gore is 30.462 meters long and represents approximately 15 degrees around the envelope in a plane defined by the ring of one of the lateral tendons). Each gore has 3 regions: region 610 between the forward end plate and the forwardmost longitudinal tendon, region 620 between the forwardmost longitudinal tendon and the rearmost longitudinal tendon, and region 630 between the rearmost longitudinal tendon and the rear end plate.

In some instances, a sleeve may be heat sealed at the seam of two gores, and each of the lateral tendons may be arranged in one of the sleeves as noted above. Opposing ends of the gores (e.g. opposing ends 630, 6540) may then be heat sealed to each of the end plates 250, 260 in order to form the envelope 210. In order to reduce the amount of material at the ends of the gores, the ends of the gores may be cut into a circular or spherical shape before being heat sealed to the end plates. In some instances, the ends of the gores may be sandwiched between a second plate, known as a doubler plate, and an end plate, and all three elements heat sealed to one another.

Figure 7:
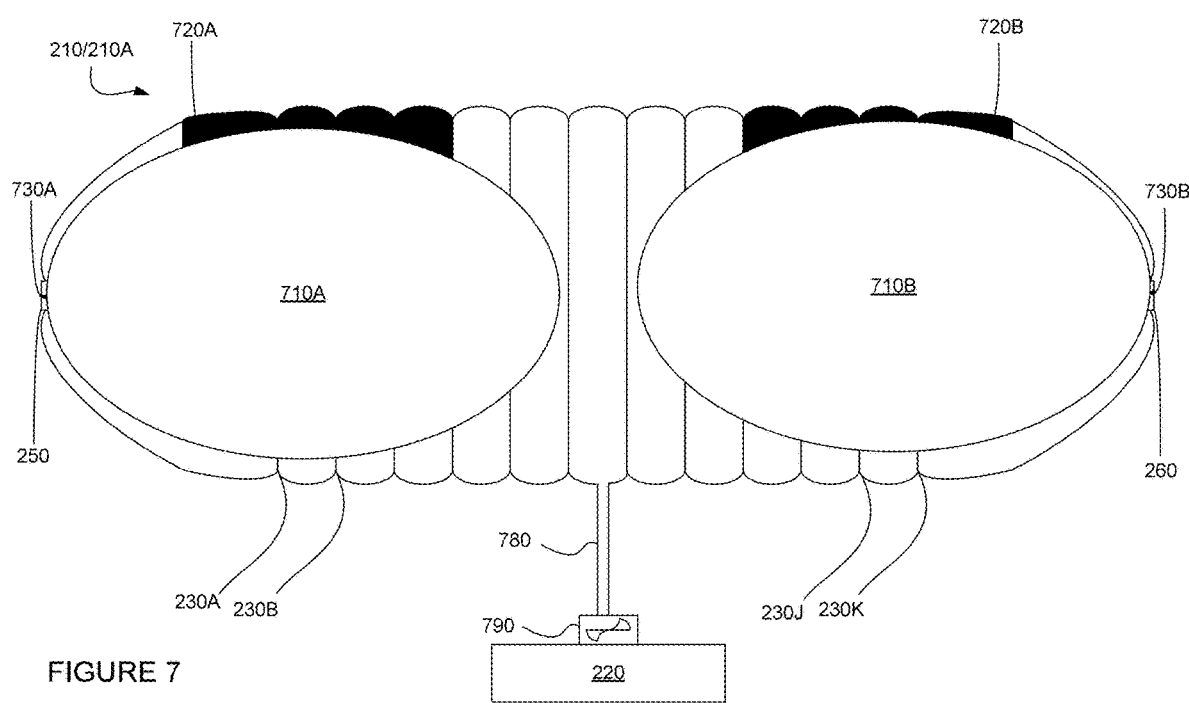
FIG. 7 is an example cross-sectional view of an aerial vehicle in accordance with aspects of the disclosure.

FIG. 7 is a partial cross-sectional view of envelope 210 and payload 220. In this example, the envelope 210 includes two internal ballonets 710A,710B, though a single ballonet or more ballonets may also be used. Although the ballonets 710A, 710B are depicted as perfectly rounded ovals floating within the envelope, this is merely for illustrative purposes. During use, the ballonets will contact and flatten against one another, floating and spreading out along the inside of the top of the envelope.

Figure 8:
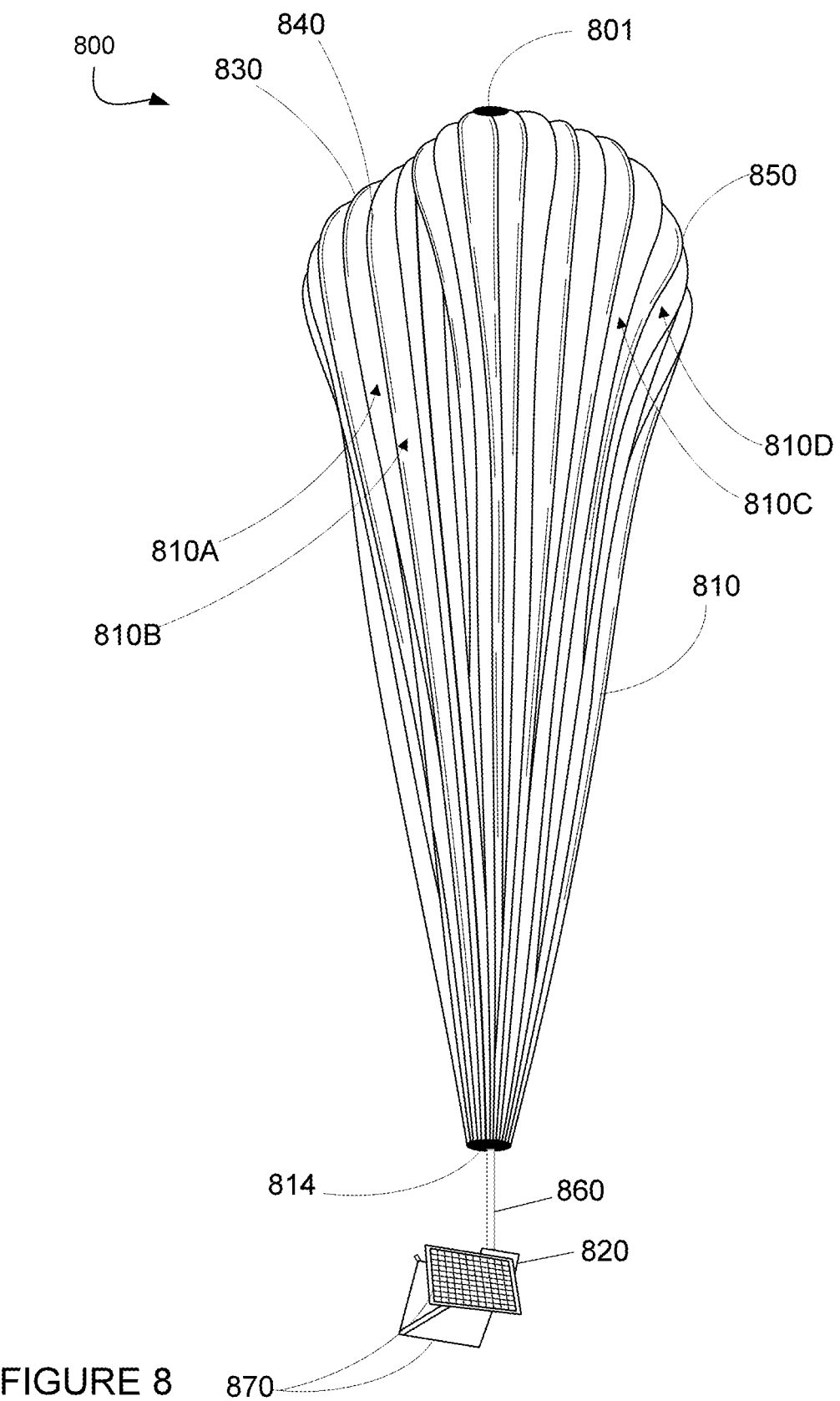
FIG. 8 is an example perspective view of an aerial vehicle in accordance with aspects of the disclosure.
Figure 9:
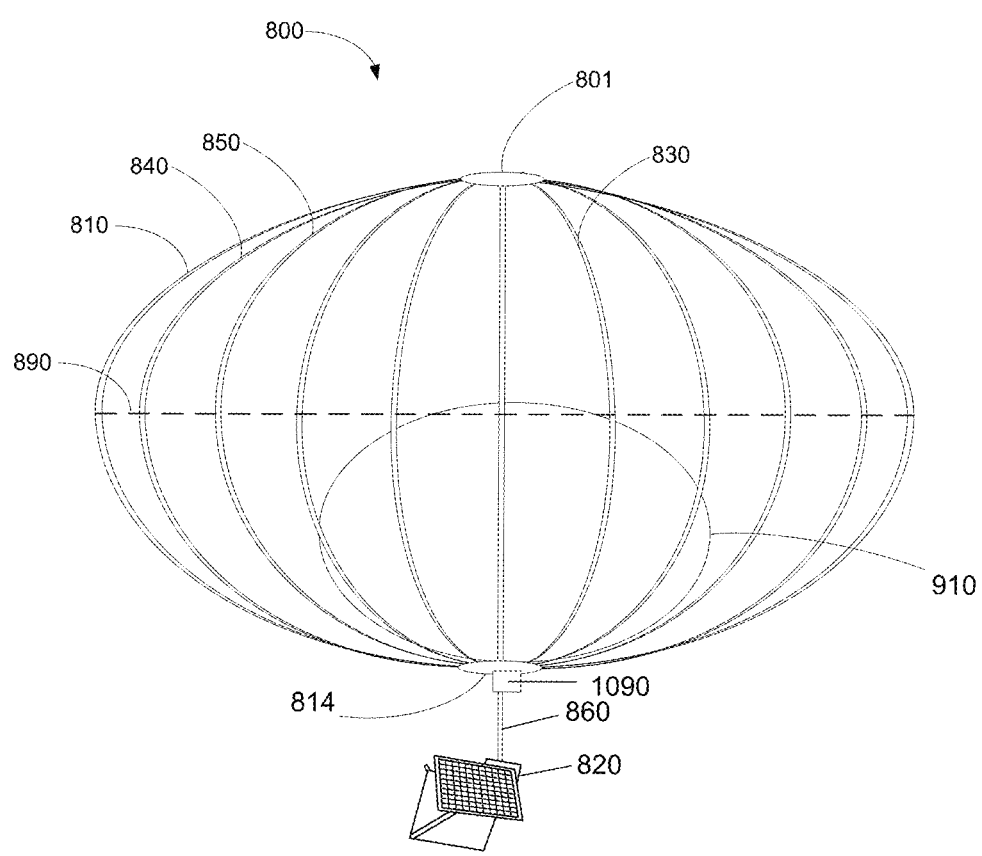
FIG. 9 is an example cross-section of an envelope of an aerial vehicle in accordance with aspects of the disclosure.

FIGS. 8 and 9 are examples of an aerial vehicle 800 which may correspond to aerial vehicles 102B or 102C, again, depicted here as a balloon. For ease of understanding, the relative sizes of and distances between aspects of the aerial vehicle 800 and ground surface, etc. are not to scale. As shown, the aerial vehicle 800 includes an envelope 810, a payload 820 and a plurality of tendons 830, 840 and 850 attached to the envelope 810. The envelope 810 may take various forms. In one instance, the envelope 810 may be constructed from materials (i.e. envelope material) such as polyethylene that do not hold much load while the aerial vehicle 800 is floating in the air during flight. Additionally, or alternatively, some or all of envelope 810 may be constructed from a highly flexible latex material or rubber material such as chloroprene. Other materials or combinations thereof may also be employed. Further, the shape and size of the envelope 810 may vary depending upon the particular implementation. Additionally, the envelope 810 may be filled with various gases or mixtures thereof, such as helium, or any other lighter-than-air gas. The envelope 810 is thus arranged to have an associated upward buoyancy force during deployment of the payload 820.

The payload 820 of aerial vehicle 800 may be affixed to the envelope by a connection 860 such as a cable and/or other rigid structures having various features as discussed further below. As discussed further below, the payload 820 may include a computer system (not shown) including one or more computing devices having one or more processors and on-board data storage (e.g. memory). The payload 820 may also include various other types of equipment and systems (not shown) to provide a number of different functions. For example, the payload 820 may include various communication systems such as optical and/or RF, a navigation software module, a positioning system, a lighting system, an altitude control system, a plurality of solar panels (such as solar panels 1010) for generating power, and a power supply (such as one or more of the batteries 1030) to store power generated by the solar panels. The power supply may also supply power to various components of aerial vehicle 800.

In view of the goal of making the envelope 810 as lightweight as possible, it may be comprised of a plurality of envelope lobes or gores that have a thin film, such as polyethylene or polyethylene terephthalate, which is lightweight, yet has suitable strength properties for use as an envelope. In this example, envelope 810 comprises envelope gores 810A, 810B, 810C, 810D.

Pressurized lift gas within the envelope 810 may cause a force or load to be applied to the aerial vehicle 800. In that regard, the tendons 830, 840, 850 provide strength to the aerial vehicle 800 to carry the load created by the pressurized gas within the envelope 810. In some examples, a cage of tendons (not shown) may be created using multiple tendons that are attached vertically and horizontally. Each tendon may be formed as a fiber load tape that is adhered to a respective envelope gore. Alternatively, a tubular sleeve may be adhered to the respective envelopes with the tendon positioned within the tubular sleeve.

Top ends of the tendons 830, 840 and 850 may be coupled together using an apparatus, such as top end plate 801 positioned at the apex of envelope 810. A corresponding apparatus, e.g., a bottom or bottom end plate 814, may be arranged at a base or bottom of the envelope 810. The top end plate 801 at the apex may be the same size and shape as and bottom end plate 814 at the bottom. Both caps include corresponding components for attaching the tendons 830, 840 and 850 to the envelope 810.

FIG. 9 is an example of the aerial vehicle 800 in flight when the lift gas within the envelope 810 is pressurized. In this example, the shapes and sizes of the envelope 810, connection 860, ballonet 910, and payload 820 are exaggerated for clarity and ease of understanding.

Rather than the typical fabric of an airship, the material of the envelopes 210, 810 may be a thin film, such as polyethylene or polyethylene terephthalate, which is lightweight, yet has suitable strength properties for use as an envelope. Using transparent plastic avoids the weight of heavier metalized fabrics and may allow light to pass through the envelope material and reach one or more solar panels arranged below the envelope at the payload or mounted on the envelope. This thus may both decrease the weight of the aerial vehicle as well as increase the amount of light that reaches the one or more solar panels thereby improving the ability of the airship to produce its own power. In addition, using an envelope made of plastic may leverage more efficient lift capacity to self-weight of the tendon-film arrangement than the traditional fabric material of an airship. Additionally, or alternatively, some or all of envelope 210 may be constructed from a highly flexible latex material or rubber material such as chloroprene. Other materials or combinations thereof may also be employed.

In addition, the shape and size of the envelope 210, 810 may vary depending upon the particular implementation. However, shaping the balloon in a more cylindrical or oval manner (as compared to the typical pumpkin envelope) may reduce the frontal area of the system and, in conjunction with the payloads 220, 820 may also limit or even eliminate the extremes of tilt that increase drag as described above with the typical pumpkin envelope.

The aerial vehicles may include one or more ballonets. During flight, these balloons may use changes in altitude to achieve navigational direction changes. Turning to FIG. 9, the ballonet 910 may hold ballast gas (e.g., air) therein, and the envelope 810 may hold lift gas around the ballonet. Similarly, as shown in FIG. 7, the one or more ballonets 710A, 710B may hold ballast gas, and the envelope 210 may hold lift gas around the one or more ballonets. For example, the altitude control system of the payload 220, 820 may cause air to be pumped as ballast into the envelopes which increases the mass of the aerial vehicle and causes the aerial vehicle to descend. Similarly, the altitude control system may cause air to be released from the ballast (and expelled from the aerial vehicle) in order to reduce the mass of the aerial vehicle and cause the aerial vehicle to ascend. Alternatively, in a reverse ballonet configuration, the one or more ballonets 710A, 710B, 910 may hold lift gas therein and the envelope 210, 810 may hold ballast gas (e.g., air) around the one or more ballonets 710A, 710B, 910, and the one or more ballonets may hold the lift gas therein. In either case, in the example of envelope 810, the ballonet 910 may be attached to one or both of the top end plate 801 or the bottom end plate 814 (attachment to the bottom end plate being depicted in FIG. 9) Further details on the attachment of the one or more ballonets 710A, 710B are described below.

The one or more ballonets may be filled with various gases or mixtures thereof, such as helium, or any other lighter-than-air gas. Together, the one or more ballonets (such as ballonets 710A, 710B, 910) and the envelope 210, 810, are arranged to have an associated upward buoyancy force during deployment of the payload 220, 820. Lift gas and ballast gas within the one or more ballonets and/or the envelope 210, 810 may cause a force or load to be applied to the aerial vehicle 200, 800 when the aerial vehicle has reached a particular altitude or environmental pressure and the envelope is pressurized. In that regard, the tendons provide strength to the aerial vehicle 200, 800 to carry the load created by the lift gas within the one or more ballonets and the ballast within the envelope 210, 810 when envelope is pressurized.

The one or more ballonets may be manufactured from the same envelope material as envelopes 210, 810. Again, in this regard, using transparent plastic avoids the weight of heavier metalized fabrics and may allow light to pass through the envelope material and reach one or more solar panels arranged below the envelope at the payload or mounted on the envelope. In some instances, the one or more ballonets may be configured as a reverse-ballonet, that is to hold lift gas rather than ballast gas. The lift gas may include various gases or mixtures thereof, such as helium, or any other lighter-than-air gas. In some instances, the one or more ballonets may be configured to hold lift gas. This reverse-ballonet configuration may enable the aerial vehicle to change its elevation by pumping ballast gas (e.g. air) into and out of the area around the one or more ballonets rather than into and out of the one or more ballonets themselves.

As an example, an altitude control system 1050 (depicted in FIG. 10) of the payload 220, 820 may cause ballast gas to be pumped into the envelope 210 and around the ballonets 710A, 710B in order to increase the mass of the aerial vehicle 200, 800 and causes the aerial vehicle to descend. Similarly, the altitude control system may cause air to be released from the envelope 210, 810 (and expelled from the aerial vehicle 200A) in order to reduce the mass of the aerial vehicle and cause the aerial vehicle to ascend. As discussed further below, the altitude control system 1050 may function in accordance with signals received from an aerial vehicle control system 1060 (depicted in FIG. 10).

When there is more than one ballonet, the ballonets may be arranged at different locations within the envelope 210 and may be connected to a seam gore between a pair of the gores. For instance, the ballonets 710A, 710B are attached to a gore seam by an additional piece of material 720A,720B in order to limit the movement of the ballonets 710A,710B within the envelope 210 as well as to increase stability of the envelope in the event of turbulence. This additional piece of material may be of thinner gauge or different material than the envelope material. This additional piece of material may restrict lateral movement, and to some extent rolling behavior, of the ballonets relative to the envelope.

As shown in FIG. 7, which represents a pressurized envelope 210, ballonet 710A is arranged closer to end plate 250 which may be a forward end plate, and the ballonet 710B is arranged closer to end plate 260 which may be a rearward end plate. Although not shown, additional ballonets may be arranged between and/or adjacent to ballonets 710A, 710B. Using multiple ballonets in such physical arrangements may provide stability and reduce the likelihood of the envelope 210 from becoming pitched (upward or downward relative to the ground surface) too far in a particular direction.

When utilizing the reverse-ballonet configuration for the aerial vehicle 200, each of the one or more ballonets may be connected to a fill port of a respective end plate. In the case of a single ballonet, the ballonet may be connected to fill ports at each of the end plates. As shown in FIG. 7, end plates 250, 260 each include a respective fill port 730A, 730B. Each of these fill ports is attached to a respective one of the ballonets 710A,710B. The fill ports 730A,730B may enable the ballonets to be filled with lift gas. As such, each of the ballonets 710A,710B, may be attached, for instance, via heat seals to the respective end plates 250, 260 (or double plates) such that the fill ports are in fluid communication with the fill ports 730A,730B as shown in FIG. 6. Thus, the aerial vehicle may be inflated with lift gas via fill ports at each of the termination, rather than to a single end plate as with a typical balloon configuration.

In order to pump the ballast gas into and out of the envelope 210, a tube 780 of material, which may be the same or similar to the material of the envelope, may extend from a bottom portion of the envelope (as shown in FIG. 6) to a fan 790 and/or air compressor. In the example of the aerial vehicle 200, the fan 790 and/or air compressor may be mounted on the payload 220 in order to avoid having to compensate for the weight of the fan on one particular location on the envelope 810. In the reverse-ballonet configuration, the fan may be activated in different directions (clockwise or counterclockwise) in order to pump or force the ballast gas into and out of the envelope 210 by way of the tube 780 and thereby increase or decrease the mass of the envelope 210 and control the elevation of the aerial vehicle 200A. Alternatively, the fan and/or air compressor may be attached to one of the end plates of the envelope, though this may require changing the shape or orientation of the envelope relative to the payload and/or adding a semi-rigid hose inside the envelope. However, this configuration (being attached to an end plate) may have lower total drag than the configuration of FIG. 6. In some instances, the tube may enter the envelope through a reinforced portion of the envelope (e.g. an area with an extra layer of envelope material heat sealed or otherwise attached thereto) or through an area of modified geometry that reduces the stress on the film in the surrounding region. The tube may be flexible and formed from the same material as the envelope material, or alternatively, may be formed from more rigid materials.

In the example of envelope 800, a fan 1090 (shown in FIG. 10) may be mounted on the bottom end plate 814 to allow for a more direct connection with the interior of the envelope 810 and/or the ballonet 910. In this regard, additional tubing like 780 would not be needed between the payload 820 and the envelope 810.

Figure 10:
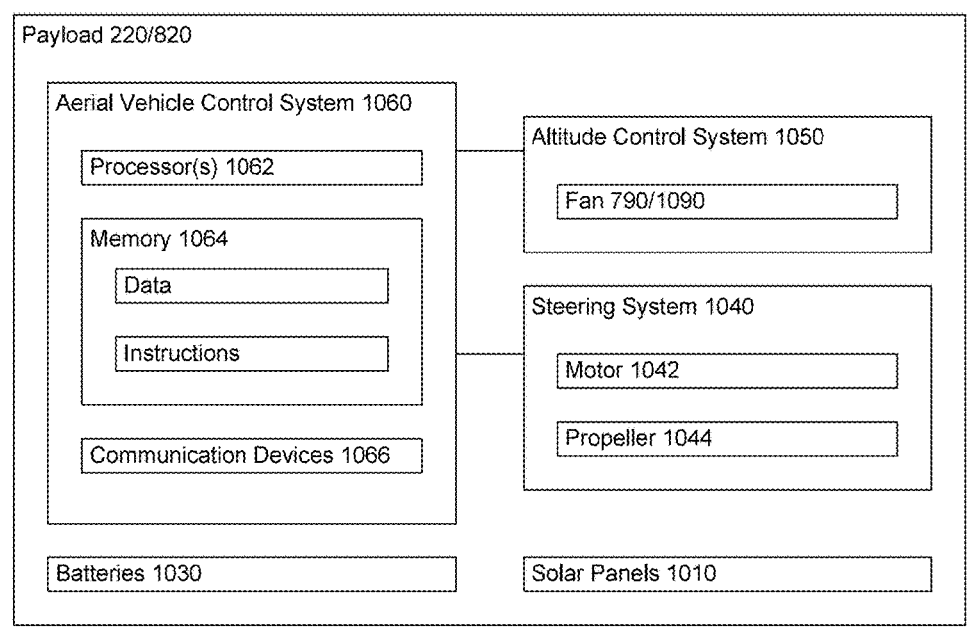
FIG. 10 is an example block diagram of a payload of an aerial vehicle in accordance with aspects of the disclosure.

FIG. 10 provides a block diagram representation of the payloads 220, 820. The payload 220, 820 may include one or more solar panels 1010, one or more batteries 1030 (e.g. the power supply 880), a steering system 1040 (though this may only be necessary for the aerial vehicle 200 and not for the aerial vehicle 800), the altitude control system 1050, the aerial vehicle control system 1060, as well as various other devices and systems not shown. The one or more solar panels 1010 may be configured to convert light from the sun to energy which can be stored in the one or more batteries 1030. The one or more batteries may then be arranged to power the various systems of the payload, including, for instance, the steering system 1040, altitude control system 1050, and the aerial vehicle control system 1060. Each of the steering system 1040, altitude control system 1050, and the aerial vehicle control system 1060 may include computers with processors and on-board data storage (such as processors 1062 and memory 1064) in order to enable these systems to process data and make various decisions for controlling the aerial vehicle. For instance, the aerial vehicle control system may include one or more communication devices 1066 such as RF or optical devices for sending and receiving signals with other devices of the system. The communication devices 1066 may also include wireless or wired connections to enable the aerial vehicle control system 1060 may also send signals to control the pitch or orientation of the solar panels 1010 as well as to the steering system 1040 and altitude control system 1050 in order to control the flight of the aerial vehicle.

In some instances, the fan 790 or air compressor may be incorporated into the altitude control system 1050 or in the case of fan 1090, may be physically separated from the altitude control system 1050. The steering system 1040 may also include a motor 1042 configured to turn or spin a propeller 1044 in order to increase or decrease the forward velocity of the aerial vehicle 200A according to the signals received from the control system 1060. Changing the orientation of the propeller 1044 relative to the payload may change the orientation and/or heading of the aerial vehicle 200 similar to a rudder of a ship. In this regard, as compared to a typical balloon which does not utilize a propeller and simply relies on changes in ballast to move up and down and air currents to move in other directions, the aerial vehicle may have better steering control.

Figure 11:
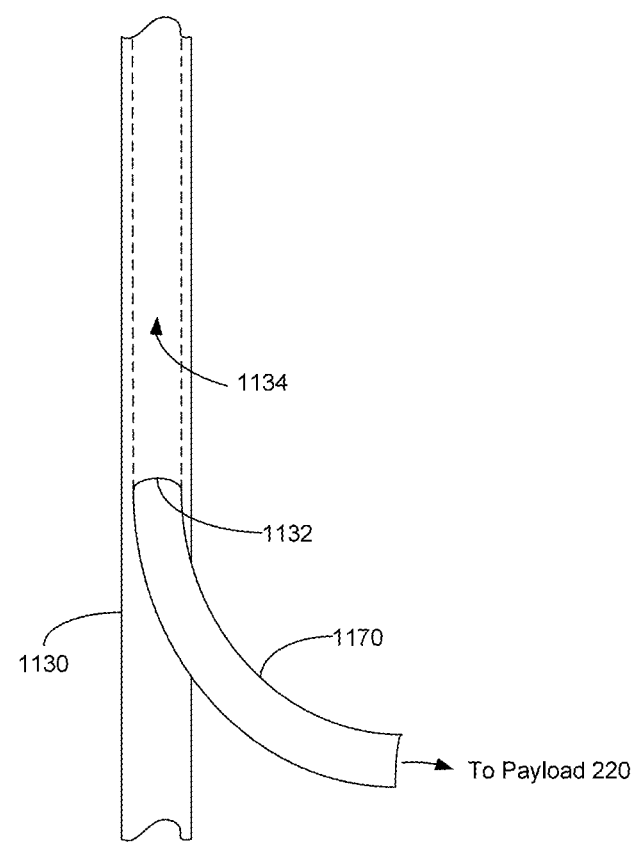
FIG. 11 is an example view of portions of tendons in accordance with aspects of the disclosure.

As noted above and depicted in FIG. 8, the payload 820 of aerial vehicle 800 may be affixed to the envelope by a connection 860 such as a cable and/or other rigid structures having various features as discussed further below. However, in order to connect the payload 220 to the envelope 210, a plurality of the longitudinal tendons may be configured with internal tendons or ropes in a splice or bury splice configuration. Turning to FIG. 11, at some location on the lateral sides of the envelope, an opening 1132 in a longitudinal tendon 1130 may allow an internal tendon 1170 to exit the longitudinal tendon. From the opening 1132, the internal tendon 1170 may extend towards and be attached to the payload 220 at one of a plurality of anchor points. The dashed-line area 1134 of longitudinal tendon 1130 represents the portion of the internal tendon 1170 that is within the longitudinal tendon 1130. In this example, the internal tendon 1170 may correspond to any of the support tendons 270A-270F, and thus, a portion of the support tendons 270A-270F is arranged within a respective one of the plurality of longitudinal tendons, such as longitudinal tendons 230E, 230F, 230G.

Alternatively, rather than using internal tendons, additional tendons may simply be attached externally to the envelope 210 and adjacent to ones of the longitudinal tendons. Again, these additional tendons may extend downwards towards and be attached to the payload 220 at a plurality of anchor points. In this example, the additional tendons may correspond to any of the support tendons 270A-270F. In the examples of FIG. 2, the payload 220 is supported by 6 tendons 270A-270F, and thus, there are six anchor points on the payload 220 at distances which may be approximately the same as the distances between adjacent longitudinal tendons. Of course, more or less anchor points may also be used depending upon the weight and/or dimensions of the payload 220.

Figure 20:
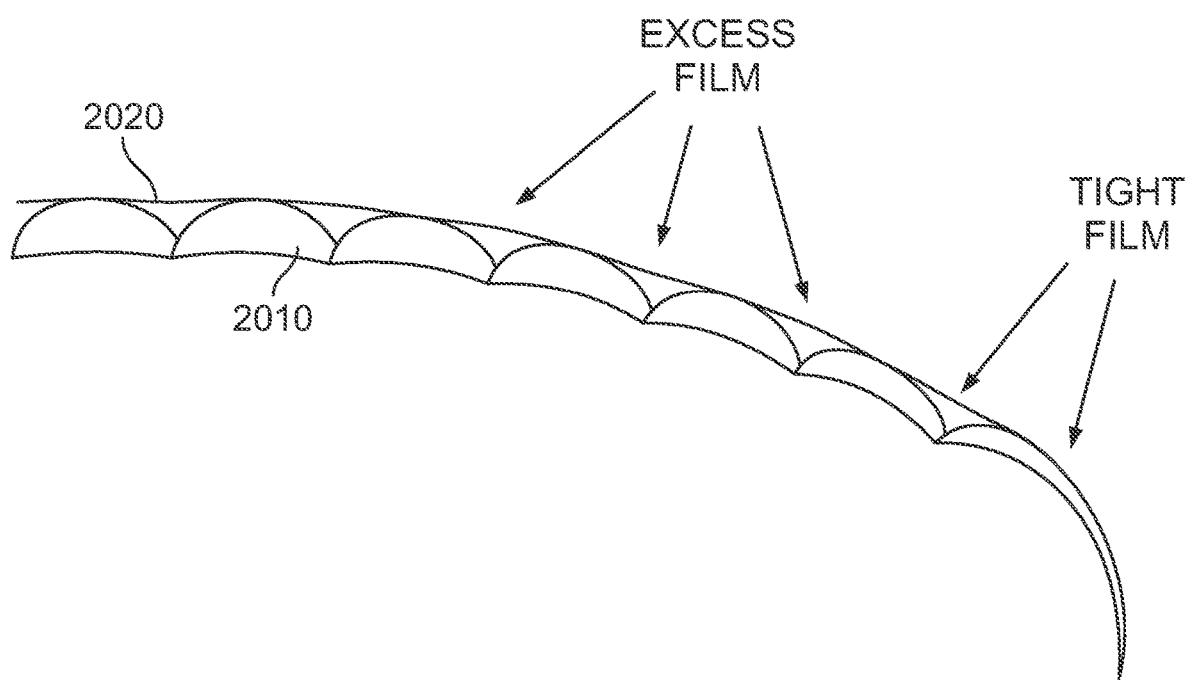
FIG. 20 is an example cross-sectional view of a portion of an envelope and a portion of an outer membrane in accordance with aspects of the disclosure.

As noted above, in order to provide a smoother contour, improve the aerodynamics of the aerial vehicle, an outer membrane may be arranged around the envelope 210, 810. FIG. 20 depicts an example cross-sectional view of an outer membrane 2020 arranged over an envelope 2010 which may correspond to envelope 210 or 810.

The outer membrane may be formed from a plurality of gores heat sealed to one another using the same polyethylene or other plastic materials as the envelope and/or the ballonets. As an example, the envelope 210, 810 and/or ballonets 710A, 710B, 910 may be 0.4 mil in thickness and the outer membrane may be 0.5 to 1.5 mil in thickness. Alternatively, the outer membrane may be made of more flexible materials such as an elastic polyurethane or spandex. The outer membrane need not include tendons.

As noted above, the outer membrane may be attached to the envelope 210, 810. Although arranged on the outside of the envelope, the dimensions of the outer membrane may be smaller than the dimensions of the envelope. In this regard, at low atmospheric pressures (e.g. at altitude), the lift gas expands against the envelope causing the outer membrane to stretch approximately 5 to 10%. This stretching may be limited by the amount of stretching in the tendons of the envelope. The stretching over the gores may provide a smoother shape to the envelope and thus improve the aerodynamics of the balloon. As an example, the outer membrane may not see any load from the envelope until the envelope is pressurized to about 400 Pa, but thereafter, there is load sharing. In this regard, as the envelope is pressurizing, the shape of the envelope will drive the outer membrane into position relative to the envelope, eventually locking the outer membrane in place.

Figure 12:
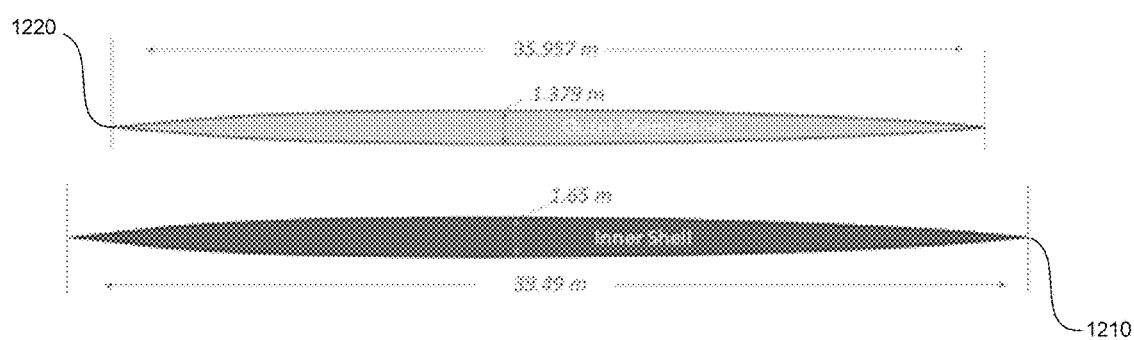
FIG. 12 is an example view of a gore of an envelope and a gore of an outer membrane in accordance with aspects of the disclosure.

The outer membrane may also be formed from a plurality of gores, though the gores of the outer membrane may be 5 to 10% shorter and/or narrower than the gores of the envelope 210, 810 to allow for the aforementioned stretching and locking in place. FIG. 12 depicts an envelope gore 1210 which may correspond to any of the gores 350A-X or 810A-D, and a gore 1220 of an outer membrane. In this regard, prior to inflation, the length of the outer membrane may be 5 to 10% smaller than the length of the envelope which the outer membrane is expected to cover when the envelope is fully pressurized. Of course, if extending end to end, the gores may also lose 5 to 10% of their length due to the material required to attach the gores to the plates (top, bottom, and/or end plates).

Figure 13:
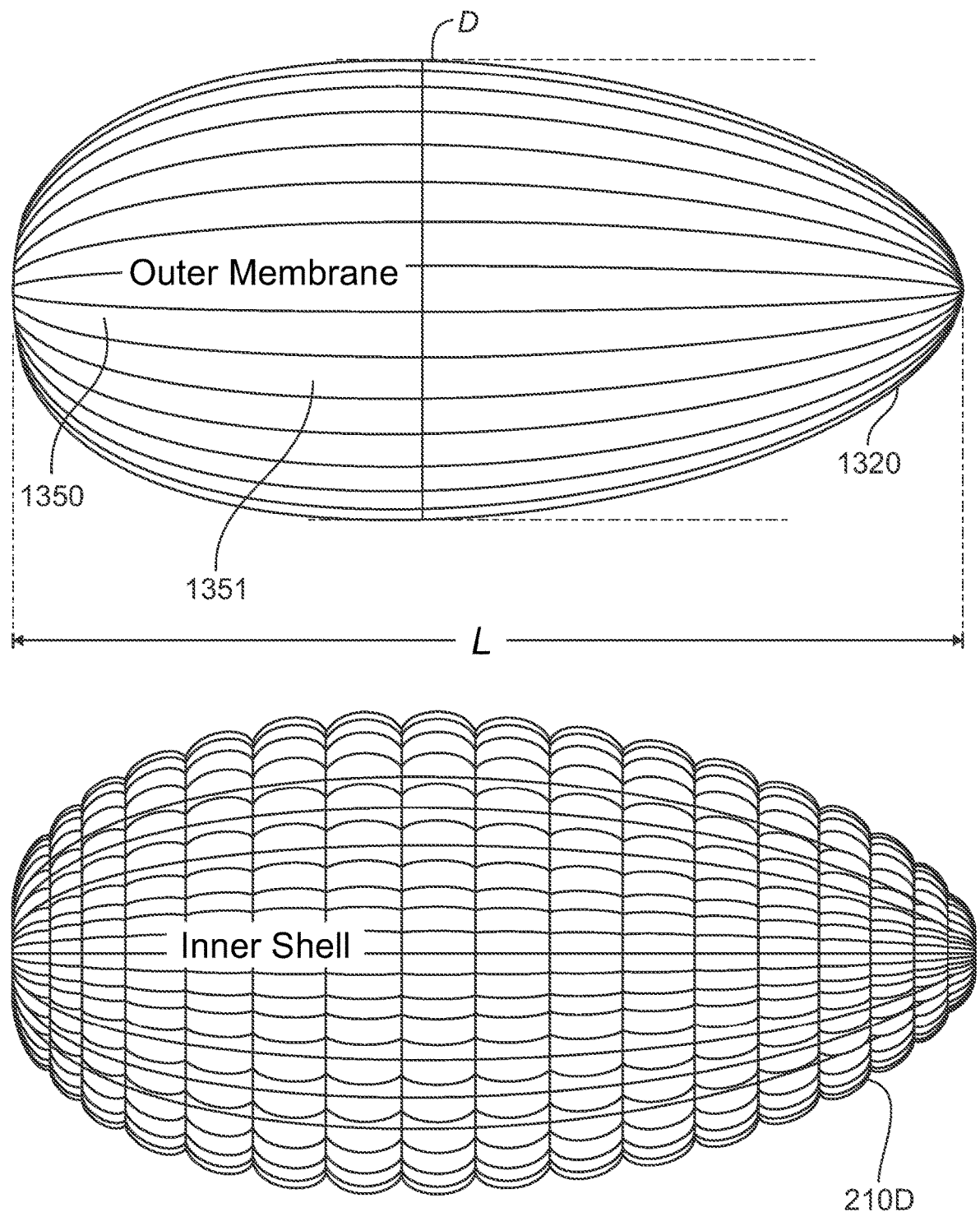
FIG. 13 is an example view of an envelope and an outer membrane in accordance with aspects of the disclosure.

In some instances, the outer membrane may extend around the entire envelope. For example, FIG. 13 depicts an example of envelope 210E of FIG. 2E which may be arranged completely within an outer membrane 1320. In this regard, the outer membrane 1320 extends around the entire envelope 210E. In such instances, the gores of the outer membrane may be 5 to 10% shorter and narrower than the gores of the envelope. As can be seen, outer membrane 1320 is formed from a plurality of gores 1350, 1351 sealed to one another to form the lobed shape of the outer membrane. However, the outer membrane 1320 does not include any tendons, and does not have a quilted appearance as in the examples of envelopes 210A-210E.

Figure 14:
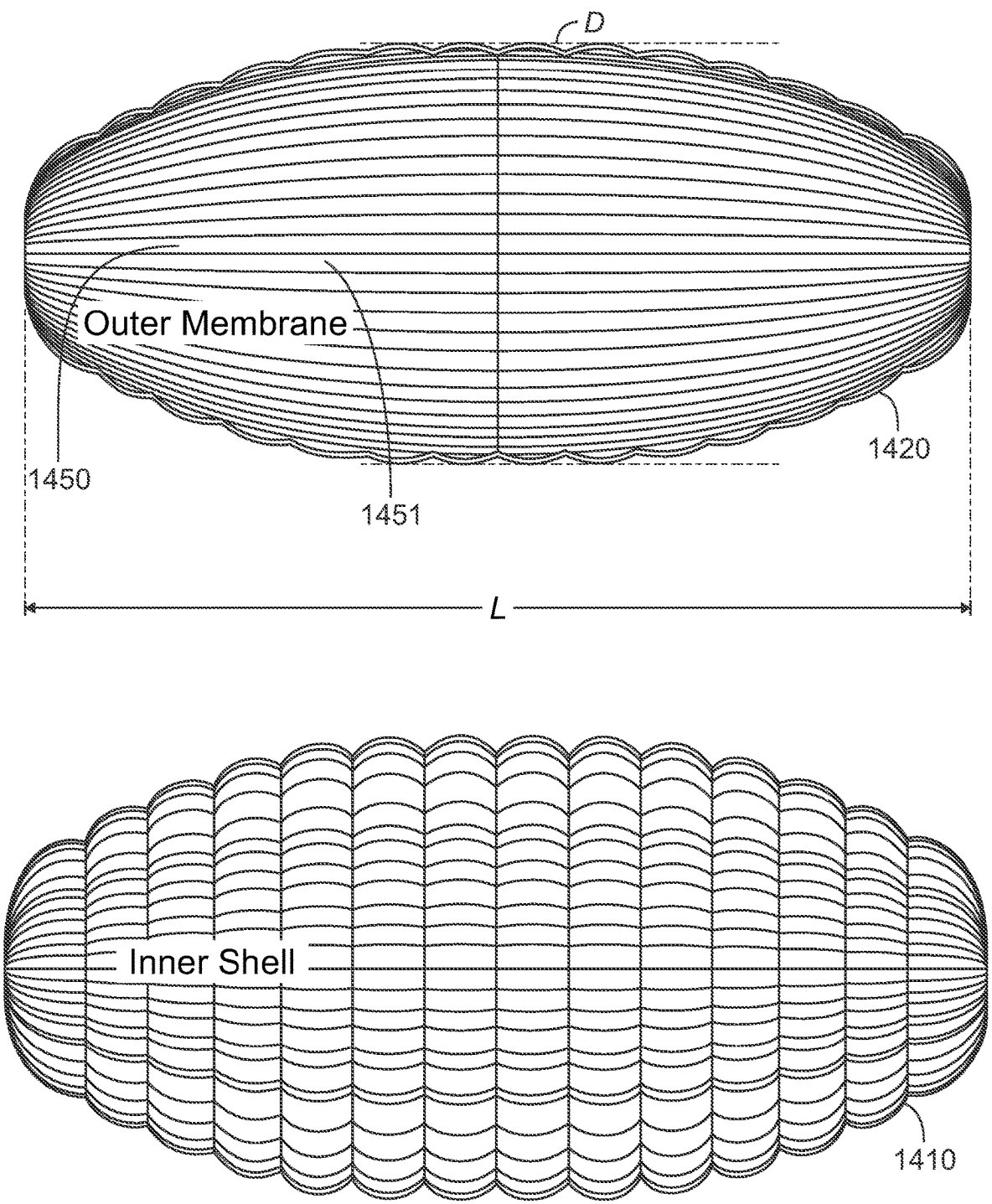
FIG. 14 is example views of an envelope and an outer membrane in accordance with aspects of the disclosure.

FIG. 14 depicts an example of an envelope 1410 (similarly shaped to envelopes 210B and 210C of FIGS. 2B and 2C) which may be arranged completely within an outer membrane 1420. In this regard, the outer membrane 1420 extends around the entire envelope 1410. In such instances, the gores of the outer membrane may be 5 to 10% shorter and narrower than the gores of the envelope. As can be seen, outer membrane 1420 is formed from a plurality of gores 1450, 1451 sealed to one another to form the lobed shape of the outer membrane. However, the outer membrane 1420 does not include any tendons, and does not have a quilted appearance as in the examples of envelopes 210A-210E.

Figure 15:
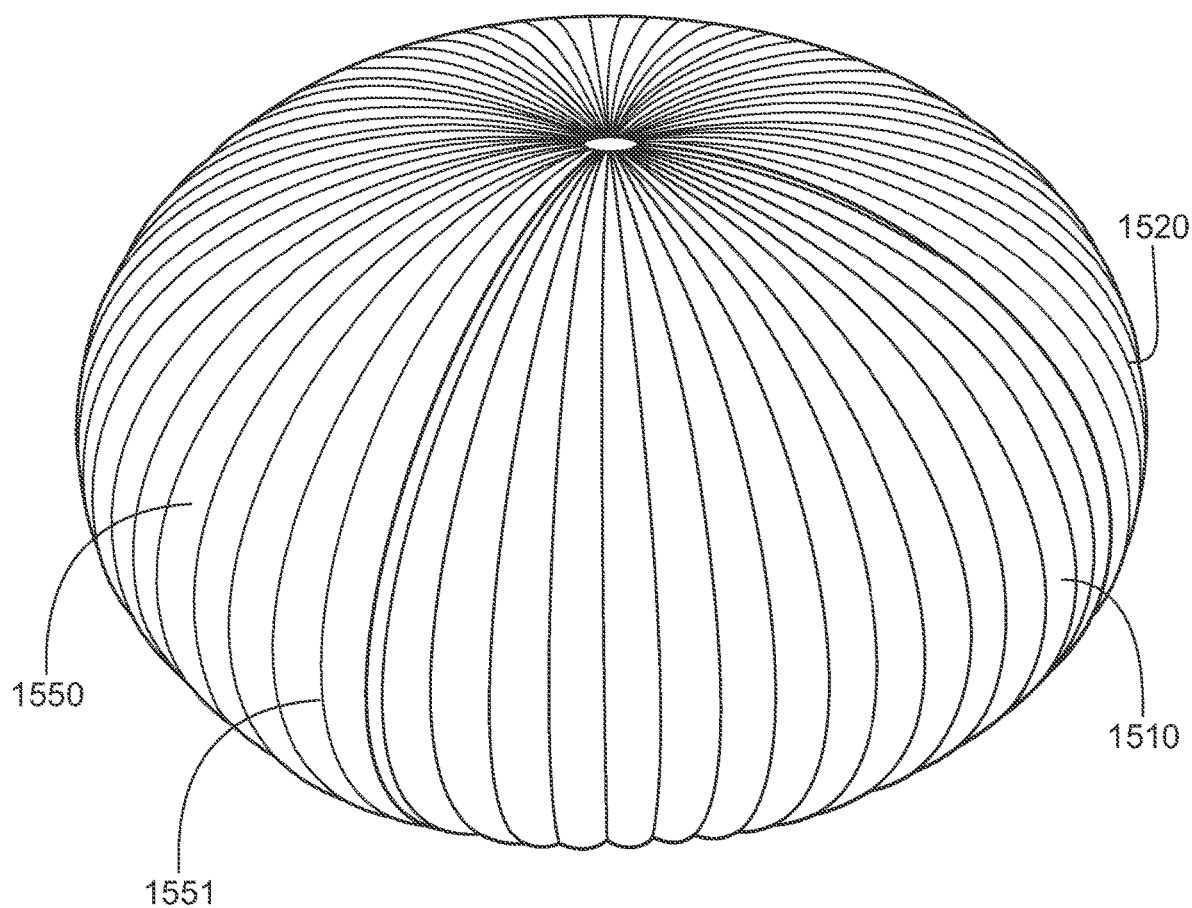
FIG. 15 is an example view of an outer membrane and a partial cut-away view of an outer membrane in accordance with aspects of the disclosure.
Figure 16:
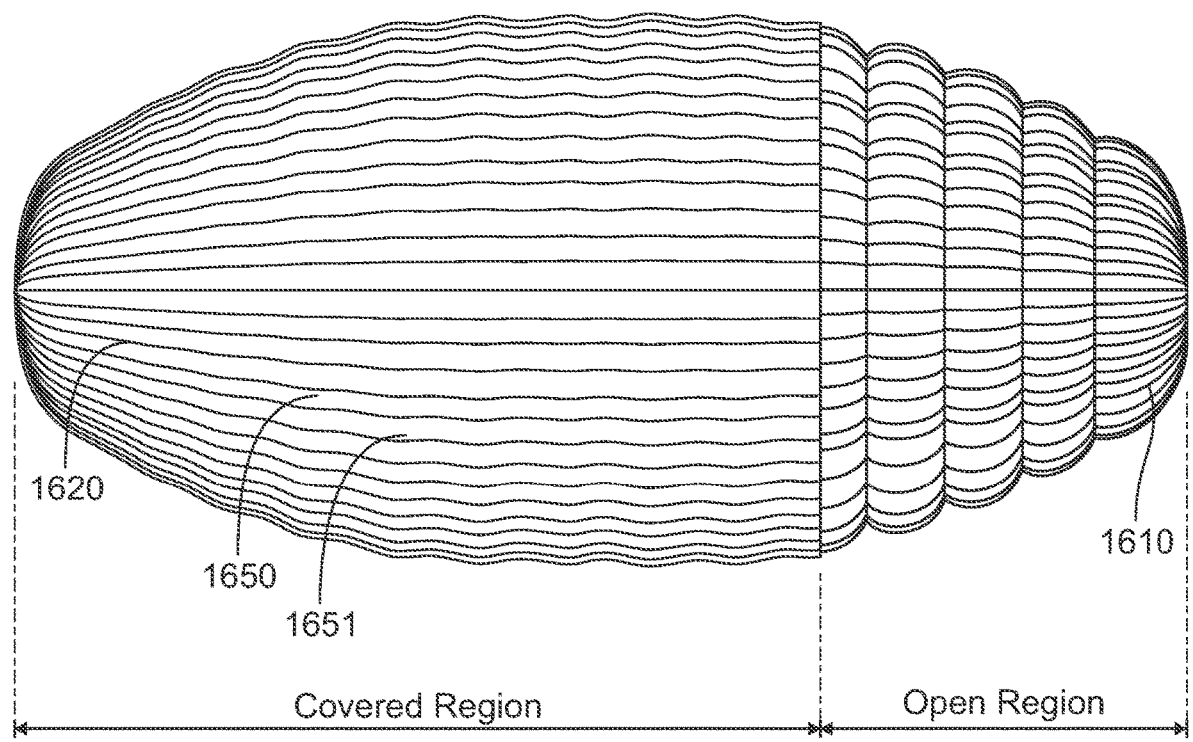
FIG. 16 is example views of an envelope and an outer membrane in accordance with aspects of the disclosure.

FIG. 15 depicts an example of an outer membrane 1520 which may be used with a pumpkin-shaped envelope, similar to envelope 810 (though with many more gores). In this regard, the outer membrane 1520 extends around the entire envelope 1510 (only partially shown in the cut-away portion). As shown in this example, the outer membrane 1520 has a "smoother" appearance than the envelope 1510. In such instances, the gores of the outer membrane may be 5 to 10% shorter and narrower than the gores of the envelope. As can be seen, outer membrane 1520 is formed from a plurality of gores 1550, 1551 sealed to one another to form the lobed shape of the outer membrane. However, the outer membrane 1520 does not include any tendons, and does not have a quilted appearance as in the examples of envelope 810. In other instances, the outer membrane may extend only part of the way over the envelope. In the case of an airship shaped balloon, the outer membrane may extend from the forward end plate towards the midpoint (and in some examples beyond) of the envelope or may only extend part way around the envelope vertically in order to improve aerodynamics during forward movements. For example, FIG. 16 depicts an outer membrane 1620 which may completely cover approximately two-thirds of the length of an envelope 1610 (similarly shaped to envelopes 210B and 210C of FIGS. 2B and 2C) starting from an end plate. In such instances, the gores of the outer membrane may be 5 to 10% narrower than the gores of the envelope. As can be seen, outer membrane 1620 is formed from a plurality of gores 1650, 1651 sealed to one another to form the lobed shape of the outer membrane. However, the outer membrane 1620 does not include any tendons, and does not have a quilted appearance as in the examples of envelopes 210A-210E.

Figure 17:
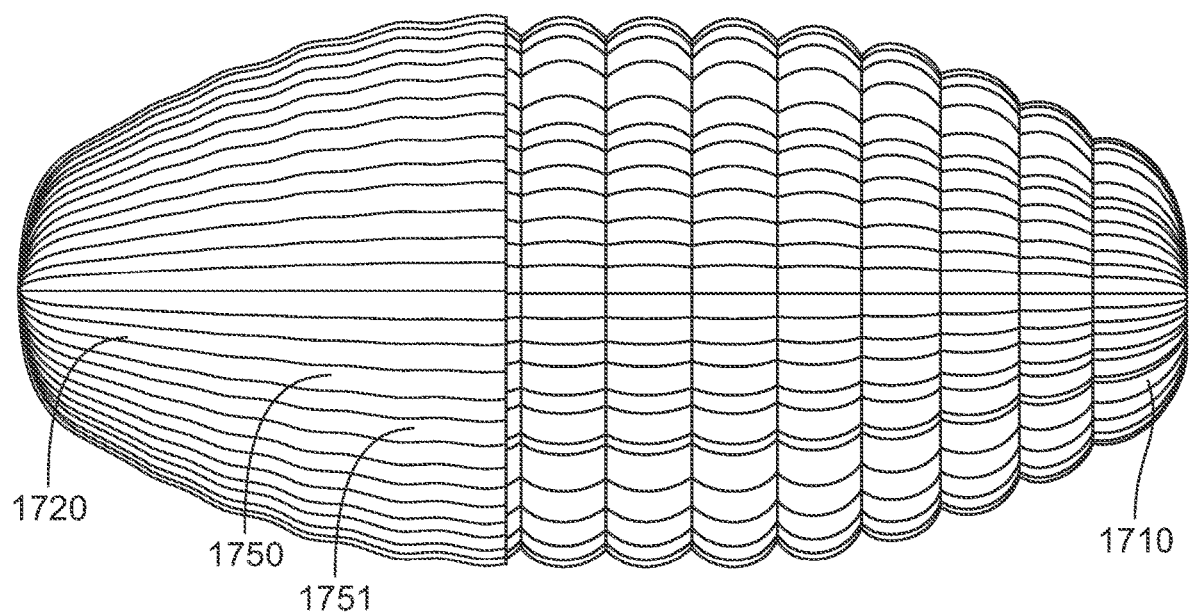
FIG. 17 is example views of an envelope and an outer membrane in accordance with aspects of the disclosure.

For another example, FIG. 17 depicts an outer membrane 1720 which may completely cover approximately one-third of the length of the envelope 1710 (similarly shaped to envelopes 210B and 210C of FIGS. 2B and 2C) starting from an end plate. In such instances, the gores of the outer membrane may be 5 to 10% narrower than the gores of the envelope. As can be seen, outer membrane 1720 is formed from a plurality of gores 1750, 1751 sealed to one another to form the lobed shape of the outer membrane. However, the outer membrane 1820 does not include any tendons, and does not have a quilted appearance as in the examples of envelopes 210A-210E.

Figure 18A:
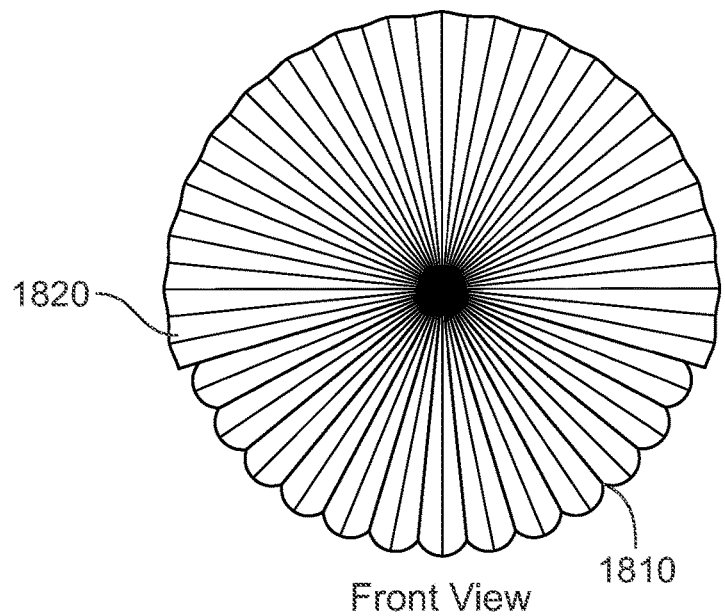
FIGS. 18A and 18B are example views of an envelope and an outer membrane in accordance with aspects of the disclosure.
Figure 18B:
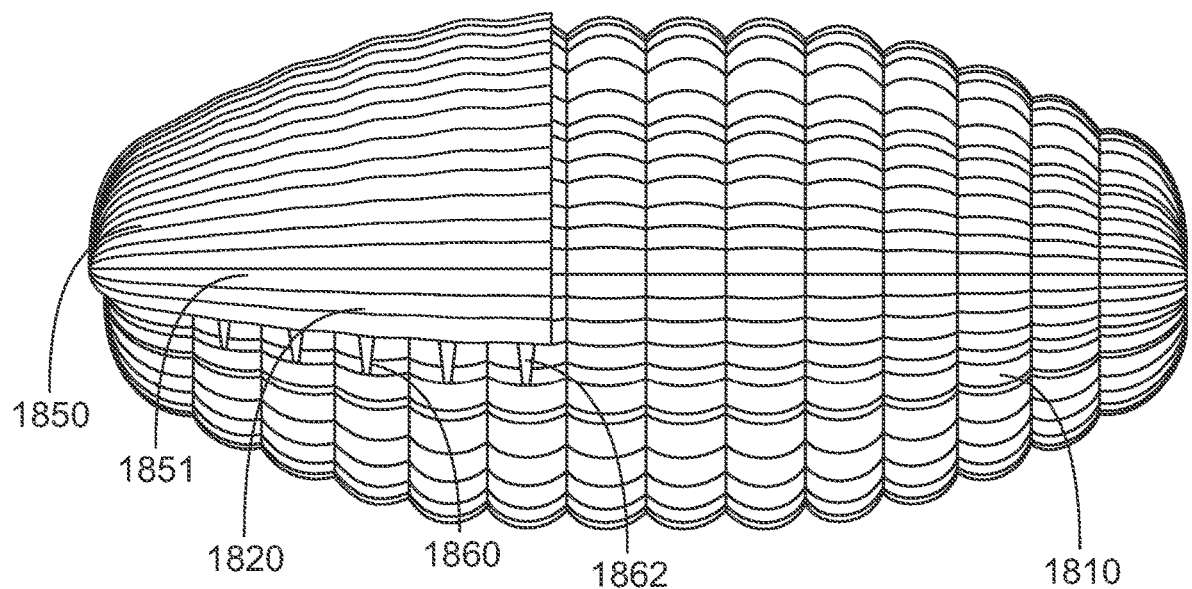

For another example, FIGS. 18A and 18B depicts an outer membrane 1820 which may partially cover approximately one-third of the length of an envelope 1810 (similarly shaped to envelopes 210B and 210C of FIGS. 2B and 2C) starting from an end plate. The partial coverage extends approximately 60 percent of the way around the envelope 1810 vertically. In such instances, the gores of the outer membrane may be 5 to 10% narrower than the gores of the envelope. As can be seen, outer membrane 1820 is formed from a plurality of gores 1850, 1851 sealed to one another to form the lobed shape of the outer membrane. However, the outer membrane 1820 does not include any tendons, and does not have a quilted appearance as in the examples of envelopes 210A-210E.

Figure 19A:
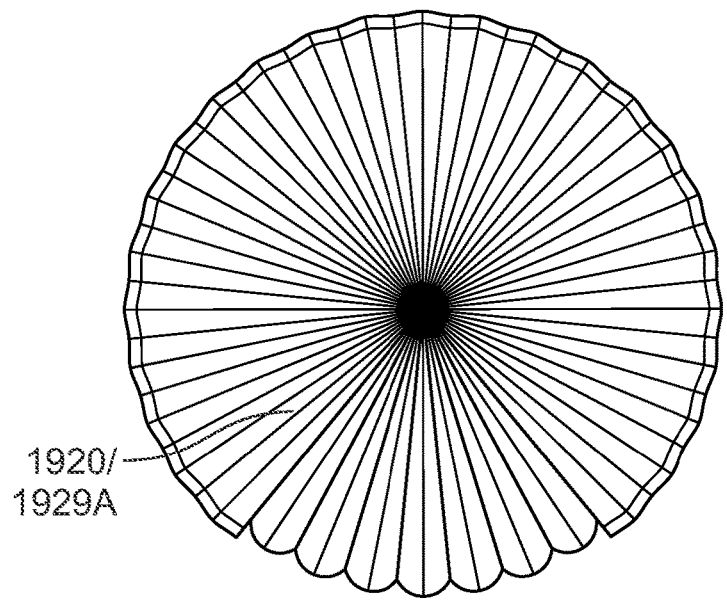
FIGS. 19A and 19B are example views of an envelope and an outer membrane in accordance with aspects of the disclosure.
Figure 19B:
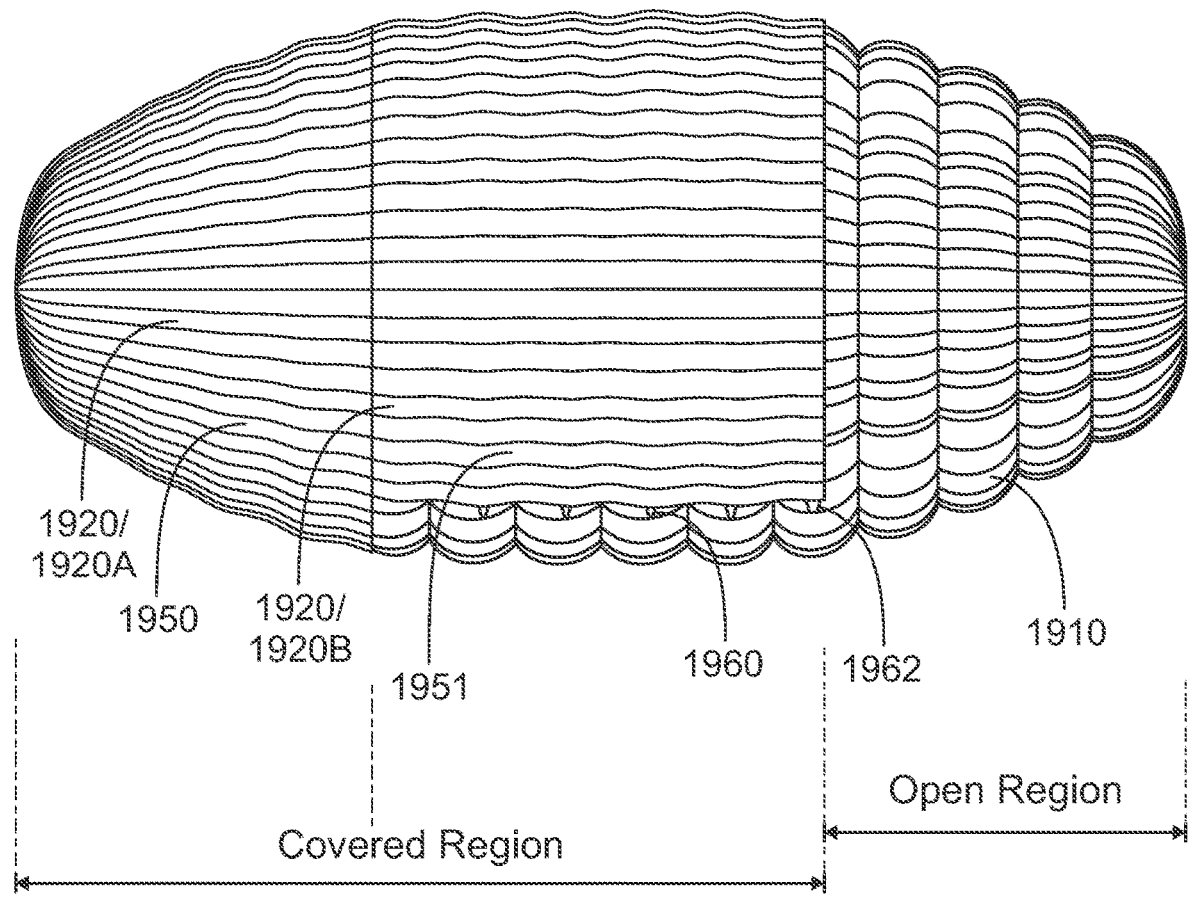

For another example, FIGS. 19A and 19B depicts an outer membrane 1920 including a first portion 1920A which may completely cover approximately one-third of the way laterally along an envelope 1910 (similarly shaped to envelopes 210B and 210C of FIGS. 2B and 2C) starting from an end plate, and there after a second portion 1920B of the outer membrane 1920 may partially cover another one-third of the way laterally along the envelope. The partial coverage extends approximately 75-80 percent of the way around the envelope 1710 vertically. In such instances, the gores of the outer membrane may be 5 to 10% narrower than the gores of the envelope. As can be seen, outer membrane 1920 is formed from a plurality of gores 1950, 1951 sealed to one another to form the lobed shape of the outer membrane. However, the outer membrane 1920 does not include any tendons, and does not have a quilted appearance as in the examples of envelopes 210A-210E.

In the case of a prolate spheroid shape balloon, the outer membrane may extend from one or both of the end plates towards the midpoint (and in some examples beyond) of the envelope or may only extend part way around the envelope vertically in order to improve aerodynamics during movements in the direction of either of the end plates. In this regard, one or both ends may appear similar to the examples of FIGS. 16, 17, 18A, 18B, 19A, and 19B. In such instances, the gores of the outer membrane may be 5 to 10% narrower than the gores of the envelope.

In the case of a pumpkin balloon, the outer membrane may extend from the top end plate towards (and in some examples beyond) the equator to improve aerodynamics during ascent. For example, referring to FIG. 8, the outer membrane may extend one half or two-thirds or some other portion of the way from the top end plate 801 towards the equator 890 of the envelope 810. In such instances, the gores of the outer membrane may be 5 to 10% narrower than the gores of the envelope. While the outer membrane could extend only part way around the envelope horizontally (similarly to FIGS. 18A and 18B), because the pumpkin balloons are not directional, this may not be ideal.

In order to provide additional stability to the outer membrane as it stretches, it may be attached to the envelope using panels or straps. The panels may prevent the outer membrane from rotating around the envelope. As one example, a panel may be sealed on one side between two gores of the envelope and at the opposite side between two gores of the outer membrane. As another example, for an airship-shaped or prolate spheroid-shaped envelope one side of a panel may be wrapped around a lateral tendon of the envelope, and the opposite side may be sealed between two gores of the outer membrane. Panels may be arranged at every lateral tendon or pair of gores of the envelope and outer membrane or at only a few (e.g. one, two or simply less than all).

Figure 21:
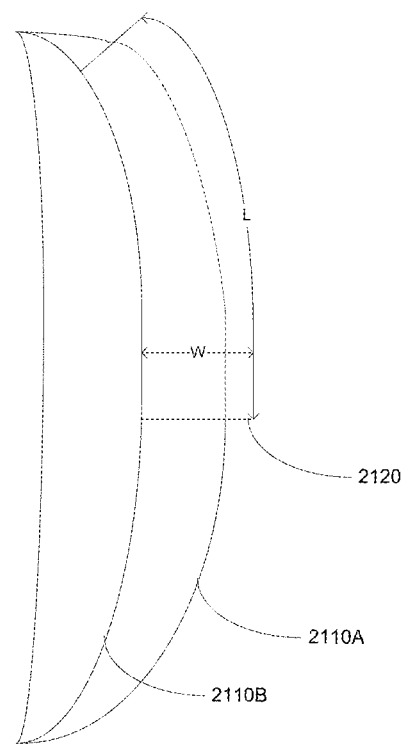
FIG. 21 is an example view of two gores of an envelope and an extra piece of material in accordance with aspects of the disclosure.
Figure 22:
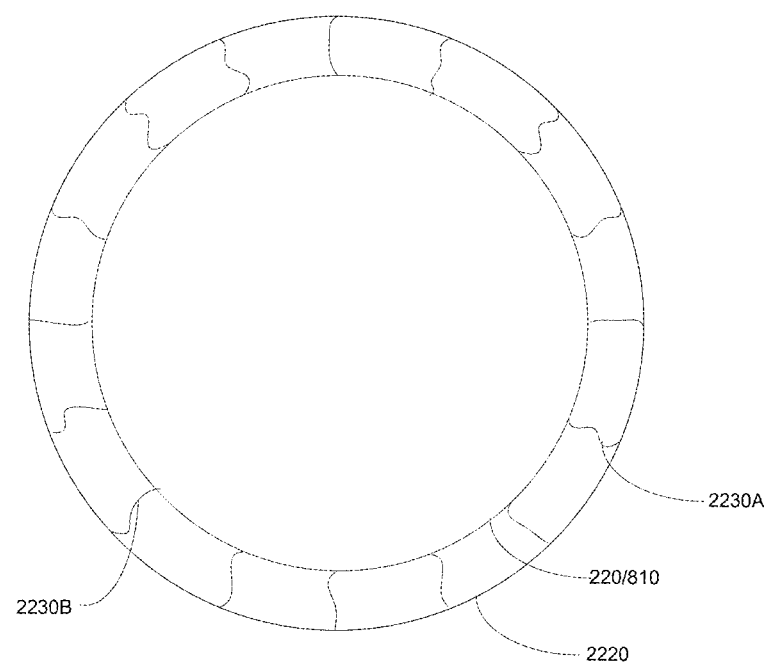
FIG. 22 is an example cross-sectional view of an envelope and a portion of an outer membrane in accordance with aspects of the disclosure.

In this regard, the envelope may be manufactured with an extra piece of material extending from a portion of each gore line to form the panels, and this extra piece of material may be sealed between gores of the outer membrane to form the panels. FIG. 21 depicts two gores 2110A and 2110B which may be used to form the envelope 210, 810. In this example, between gores 2110A and 2110B is an extra piece of material 2120 which extends beyond the surfaces which will become the exterior surface of the envelope 210, 810. The dashed-lined edges of gore 2110A represent areas of gore 2110A that are behind the extra piece of material 2120 in the view of FIG. 21. For ease of manufacture, the extra piece of material 2120 can be wider (in direction W) than required as the heat-sealing process will remove any excess. These extra pieces of material may be arranged between only one of the gores of the envelope, at least two of the gores of the envelope, or more than two gores of the ballonet and up to all of the gores of the envelope. As shown in the cross-sectional view of FIG. 22, when the envelope 210 (top-down view), 810 (lateral view) is partially pressurized, the panels 2230A, 2230B may help to maintain the position of the envelope within an outer membrane 2220 and provide stability.

In addition to panels, when the outer membrane includes free edges as it extends only partially around the envelope, such as in the examples of FIGS. 18A, 18B, 19A, and 19B, straps or other additional pieces of material may be used to maintain the position of the outer membrane on the envelope. As an example, straps 1860, 1862 and 1960, 1962 are depicted along the free edges of the outer membranes 1820, 1920, respectively.

In some instances, these panels and straps may be made weak by including perforated cuts with a breakage line. This may reduce the potential for load transfer from the panel to the structural components of the envelope in the event of a failure of the envelope.

In some instances, the outer membrane may include one or more openings to influence the aerodynamics of the envelope. For example, the outer membrane may be perfectly sealed around the top or end plate of the envelope (depending upon the shape of the balloon), may be only partially sealed in order to allow air to pass between the envelope and the outer membrane from the top or end plate, or may be open at the free edges as depicted in FIGS. 16, 17 and 18A.

In some instances, the outer surface of the outer membrane may be perforated or roughened at or near areas where features (such as fins, suspension lines, or plates (e.g. top or base or end plates which may include termination systems, sensors and other features), may be mounted to the outer membrane. This may be achieved by using textured stickers (such as commercially available trip dots), paint applied to the surface, or by making holes or perforations. This may reduce the impact of air flow around those features. In other words, such features may change the behavior of air moving around these features, and thereby may reduce the drag impact of those features.

The features described herein may provide for a shaped envelope for an aerial vehicle with improved aerodynamics. Given that the lobed shapes of the envelopes described here can generate quite a bit of drag, adding the outer membrane provides a smoother profile for air flow which in turn results in drag reduction by 25% or more. This is a significant improvement in the aerodynamics of these envelopes which also improves the maneuverability and efficiencies of these aerial vehicles.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An aerial vehicle comprising:
    an envelope having a plurality of tendons and formed from a first plurality of gores;
    one or more ballonets arranged within the envelope;
    an outer membrane arranged around at least part of the envelope and formed from a second plurality of gores; and
    at least one panel attached at one side to the outer membrane between a pair of the second plurality of gores and attached at an opposite side to the envelope, and wherein the outer membrane is arranged to improve aerodynamics of the envelope when the aerial vehicle is in flight.

2. The aerial vehicle of claim 1, wherein the envelope includes lateral and longitudinal tendons, and wherein the opposite side is attached to one of the lateral tendons.

3. The aerial vehicle of claim 1, wherein the outer membrane is formed from a first material of a first thickness, and wherein the envelope is formed from the first material of a second thickness, the first thickness being less than the second thickness.

4. The aerial vehicle of claim 1, wherein the outer membrane is formed from a first material of a first thickness, and wherein the envelope is formed from a second material, the first material being different from the second material.

5. The aerial vehicle of claim 1, wherein the envelope is a pumpkin shaped envelope.

6. The aerial vehicle of claim 5, wherein the outer membrane is attached to a top end plate of the envelope.

7. The aerial vehicle of claim 6, wherein the outer membrane is sealed completely around the top end plate.

8. The aerial vehicle of claim 6, wherein the outer membrane is sealed partially around the top end plate such that air may pass between the top end plate and the outer membrane and between the outer membrane and the envelope.

9. The aerial vehicle of claim 6, wherein the outer membrane is attached to a bottom end plate of the envelope.

10. The aerial vehicle of claim 1, wherein the envelope is a prolate spheroid shaped envelope.

11. The aerial vehicle of claim 10, wherein the outer membrane is attached to an end plate of the envelope.

12. The aerial vehicle of claim 11, wherein the outer membrane is sealed completely around the end plate.

13. The aerial vehicle of claim 11, wherein the outer membrane is sealed partially around the end plate such that air may pass between the end plate and the outer membrane and between the outer membrane and the envelope.

14. The aerial vehicle of claim 11, wherein the outer membrane is attached to a second end plate of the envelope.

15. The aerial vehicle of claim 1, wherein the envelope is an airship shaped envelope.

16. The aerial vehicle of claim 15, wherein the outer membrane is attached to a forward end plate of the envelope.

17. The aerial vehicle of claim 16, wherein the outer membrane is sealed completely around the forward end plate.

18. The aerial vehicle of claim 16, wherein the outer membrane is sealed partially around the forward end plate such that air may pass between the forward end plate and the outer membrane and between the outer membrane and the envelope.

19. The aerial vehicle of claim 16, wherein the outer membrane is attached to a rearward end plate of the envelope.

20. The aerial vehicle of claim 1, wherein the outer membrane is configured to stretch over the envelope when the envelope is pressurized.

* * * * *